US012647425B1

(12) United States Patent
Dunsmore et al.

(10) Patent No.: US 12,647,425 B1
(45) Date of Patent: Jun. 2, 2026

(54) SECURE CONNECTIVITY FROM EXTERNAL CLIENTS TO DYNAMICALLY CHANGING CLOUD RESOURCE GROUPS

(71) Applicant: Amazon Technologies, Inc., Seattle, WA (US)

(72) Inventors: Devlin Roarke Dunsmore, Bothell, WA (US); Bashuman Deb, Aldie, VA (US); Aditya Chayapathy, Seattle, WA (US); Michael P Quinn, Las Vegas, NV (US); Rajat Tyagi, Seattle, WA (US); Shovan Kumar Das, Medina, WA (US); Thomas Nguyen Spendley, Rockville, MD (US); Anoop Dawani, Redmond, WA (US); Sujan Bolisetti, Lake Stevens, WA (US); Benjamin Wojtowicz, Fort Lauderdale, FL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/900,057

(22) Filed: Sep. 27, 2024

(51) Int. Cl.
*G06F 21/00* (2013.01)
*H04L 9/40* (2022.01)
(52) U.S. Cl.
CPC ........ *H04L 63/104* (2013.01); *H04L 63/0272* (2013.01)
(58) Field of Classification Search
None
See application file for complete search history.

(56) References Cited

U.S. PATENT DOCUMENTS

| | | | |
|---|---|---|---|
| 8,493,851 B2 | 7/2013 | Fan | |
| 9,288,193 B1 * | 3/2016 | Gryb | G06F 21/44 |
| 9,600,664 B1 * | 3/2017 | Roth | G06F 21/554 |
| 10,110,585 B2 | 10/2018 | Ghafourifar | |
| 10,182,129 B1 * | 1/2019 | Peterson | G06F 11/3006 |
| 10,754,575 B2 * | 8/2020 | Stronge | G06F 3/065 |
| 10,834,044 B2 * | 11/2020 | Tillotson | H04L 12/4633 |
| 10,904,240 B2 | 1/2021 | Bosch | |
| 11,799,860 B2 | 10/2023 | Shah | |
| 11,863,582 B2 | 1/2024 | Gupta | |
| 2015/0271023 A1 | 9/2015 | Anderson | |
| 2017/0180487 A1 * | 6/2017 | Frank | G06F 11/3688 |
| 2018/0018082 A1 * | 1/2018 | Sarbin | H04L 41/22 |
| 2020/0216176 A1 | 7/2020 | Ma | |
| 2020/0336466 A1 | 10/2020 | Goldschlag | |
| 2021/0119940 A1 | 4/2021 | Kumar | |

(Continued)

FOREIGN PATENT DOCUMENTS

CN        115866012 A     3/2023

*Primary Examiner* — Maung T Lwin
(74) *Attorney, Agent, or Firm* — Robert C. Kowert; Kowert, Hood, Munyon, Rankin & Goetzel, P.C.

(57) ABSTRACT

An endpoint for accessing a group of cloud resources from a set of client devices outside the cloud is established. In response to detecting that, as a result of a configuration change, a particular cloud resource has joined the group, addressing information for the particular cloud resource is generated. An access verifier associated with the endpoint receives a packet directed from a client device using the addressing information. In response to determining, based on user identity metadata of the user and based on device status metadata of the client device, that the packet satisfies a security requirement, the packet is delivered to the particular cloud resource.

20 Claims, 14 Drawing Sheets

(56)                 References Cited

U.S. PATENT DOCUMENTS

| | | |
|---|---|---|
| 2022/0103517 A1 | 3/2022 | Luotojarvi |
| 2022/0210173 A1 | 6/2022 | Katmor |
| 2022/0329576 A1 | 10/2022 | Nikam |
| 2022/0337590 A1 | 10/2022 | Jaiswal |
| 2022/0353244 A1 | 11/2022 | Kahn |
| 2023/0079444 A1 | 3/2023 | Parla |
| 2023/0224167 A1 | 7/2023 | Wang |
| 2024/0171573 A1 | 5/2024 | Bolisetti |
| 2024/0171583 A1 | 5/2024 | Das |
| 2024/0314115 A1 | 9/2024 | Parla |
| 2025/0039242 A1 | 1/2025 | Desai |
| 2025/0047759 A1 | 2/2025 | Parla |

* cited by examiner

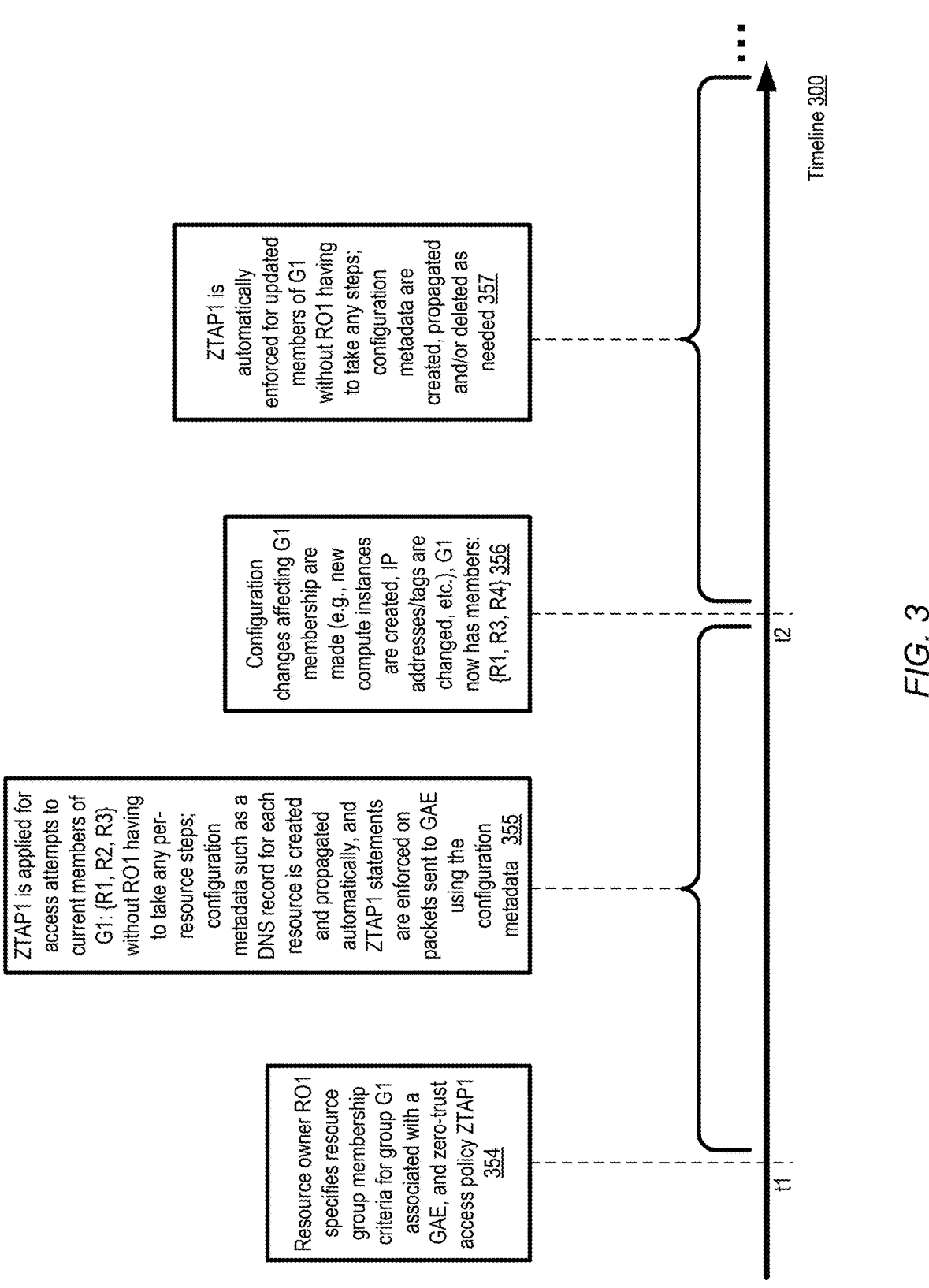

Resource owner RO1 specifies resource group membership criteria for group G1 associated with a GAE, and zero-trust access policy ZTAP1 354

ZTAP1 is applied for access attempts to current members of G1: {R1, R2, R3} without RO1 having to take any per-resource steps; configuration metadata such as a DNS record for each resource is created and propagated automatically, and ZTAP1 statements are enforced on packets sent to GAE using the configuration metadata 355

Configuration changes affecting G1 membership are made (e.g., new compute instances are created, IP addresses/tags are changed, etc.), G1 now has members: {R1, R3, R4} 356

ZTAP1 is automatically enforced for updated members of G1 without RO1 having to take any steps; configuration metadata are created, propagated and/or deleted as needed 357 t1 t2

Timeline 300

FIG. 3

Figure 4:
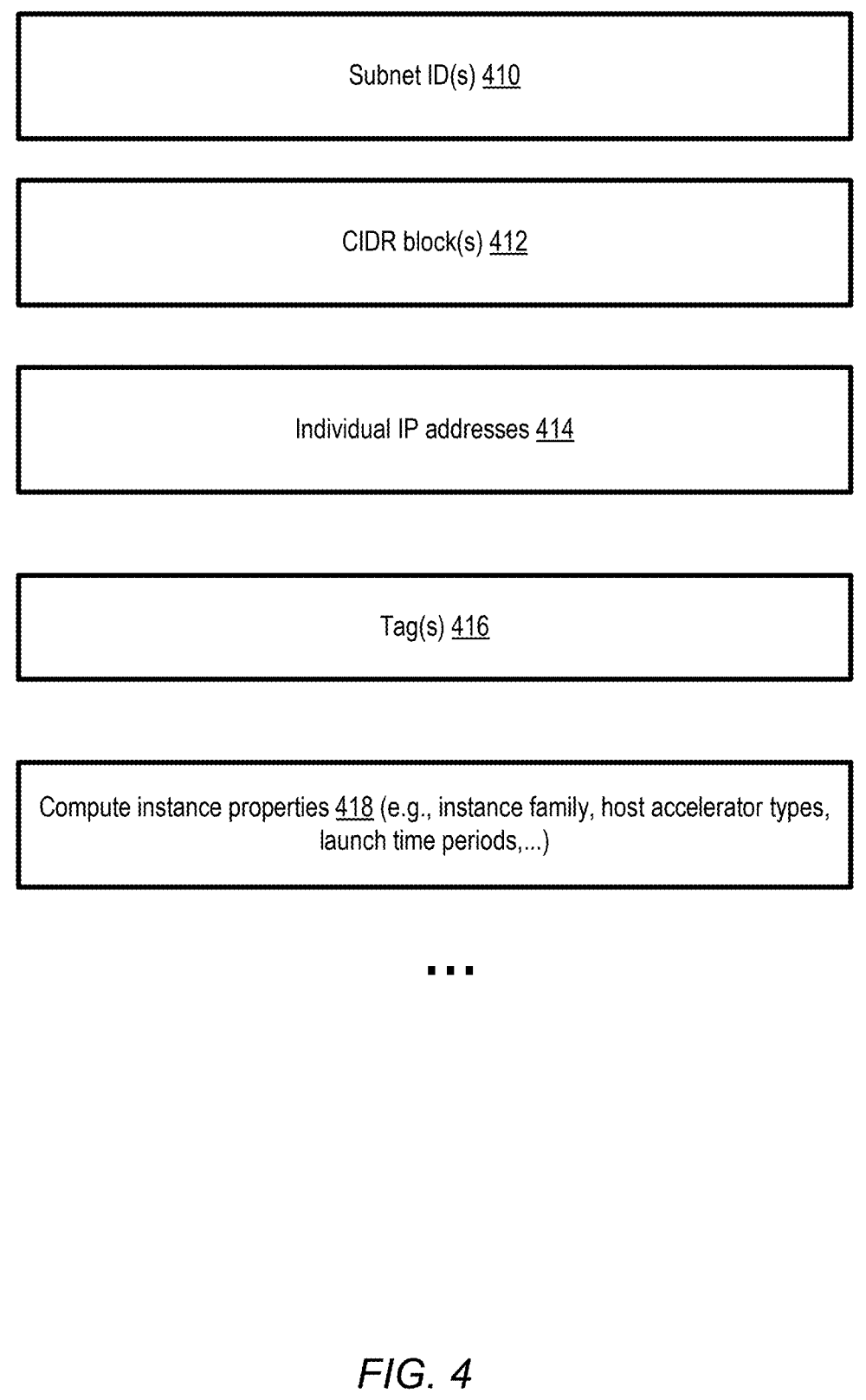

Subnet ID(s) 410

CIDR block(s) 412

Individual IP addresses 414

Tag(s) 416

Compute instance properties 418 (e.g., instance family, host accelerator types, launch time periods,...)

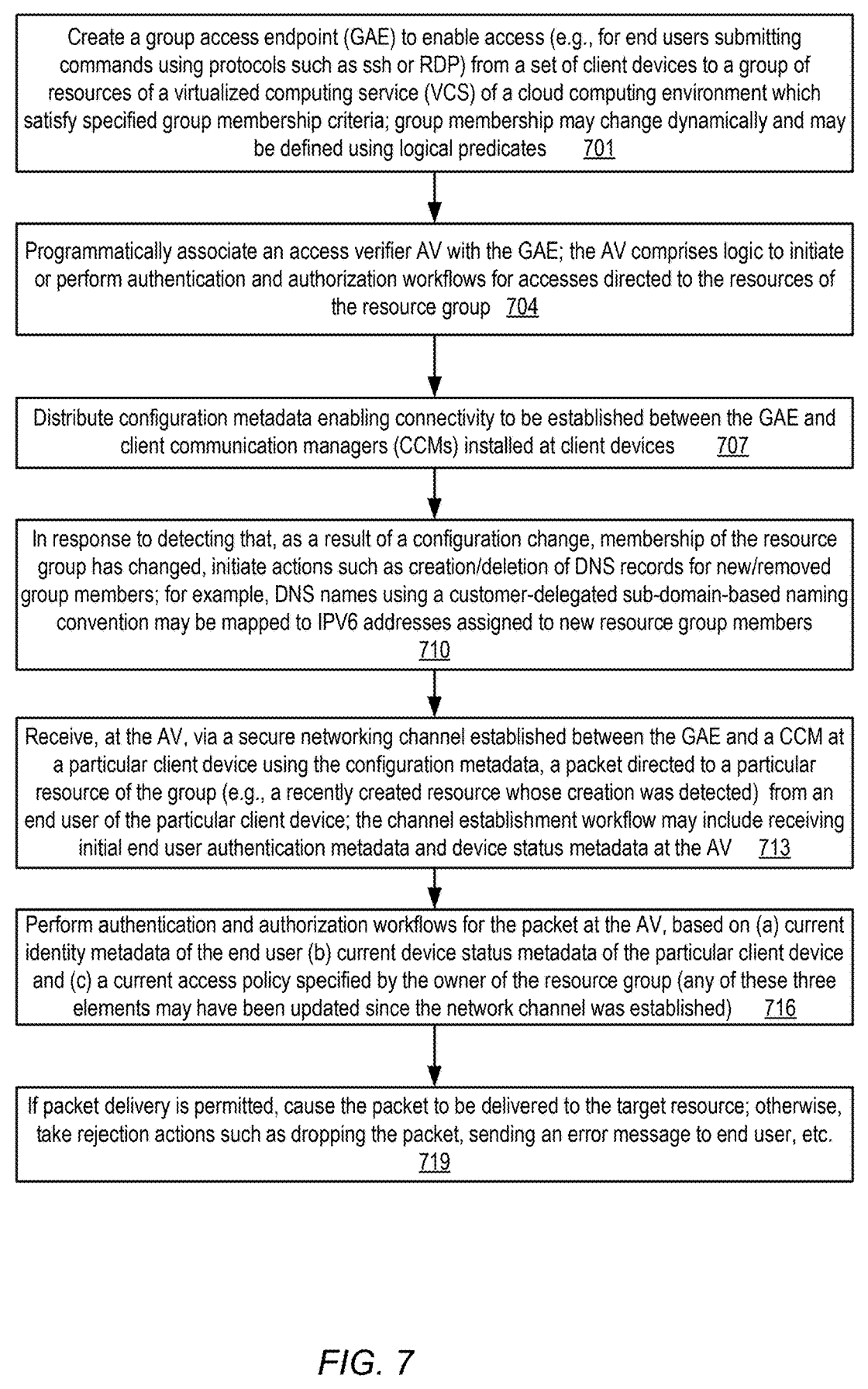

Create a group access endpoint (GAE) to enable access (e.g., for end users submitting commands using protocols such as ssh or RDP) from a set of client devices to a group of resources of a virtualized computing service (VCS) of a cloud computing environment which satisfy specified group membership criteria; group membership may change dynamically and may be defined using logical predicates   701

Programmatically associate an access verifier AV with the GAE; the AV comprises logic to initiate or perform authentication and authorization workflows for accesses directed to the resources of the resource group   704

Distribute configuration metadata enabling connectivity to be established between the GAE and client communication managers (CCMs) installed at client devices   707

In response to detecting that, as a result of a configuration change, membership of the resource group has changed, initiate actions such as creation/deletion of DNS records for new/removed group members; for example, DNS names using a customer-delegated sub-domain-based naming convention may be mapped to IPV6 addresses assigned to new resource group members   710

Receive, at the AV, via a secure networking channel established between the GAE and a CCM at a particular client device using the configuration metadata, a packet directed to a particular resource of the group (e.g., a recently created resource whose creation was detected) from an end user of the particular client device; the channel establishment workflow may include receiving initial end user authentication metadata and device status metadata at the AV   713

Perform authentication and authorization workflows for the packet at the AV, based on (a) current identity metadata of the end user (b) current device status metadata of the particular client device and (c) a current access policy specified by the owner of the resource group (any of these three elements may have been updated since the network channel was established)   716

If packet delivery is permitted, cause the packet to be delivered to the target resource; otherwise, take rejection actions such as dropping the packet, sending an error message to end user, etc.   719

*FIG. 7*

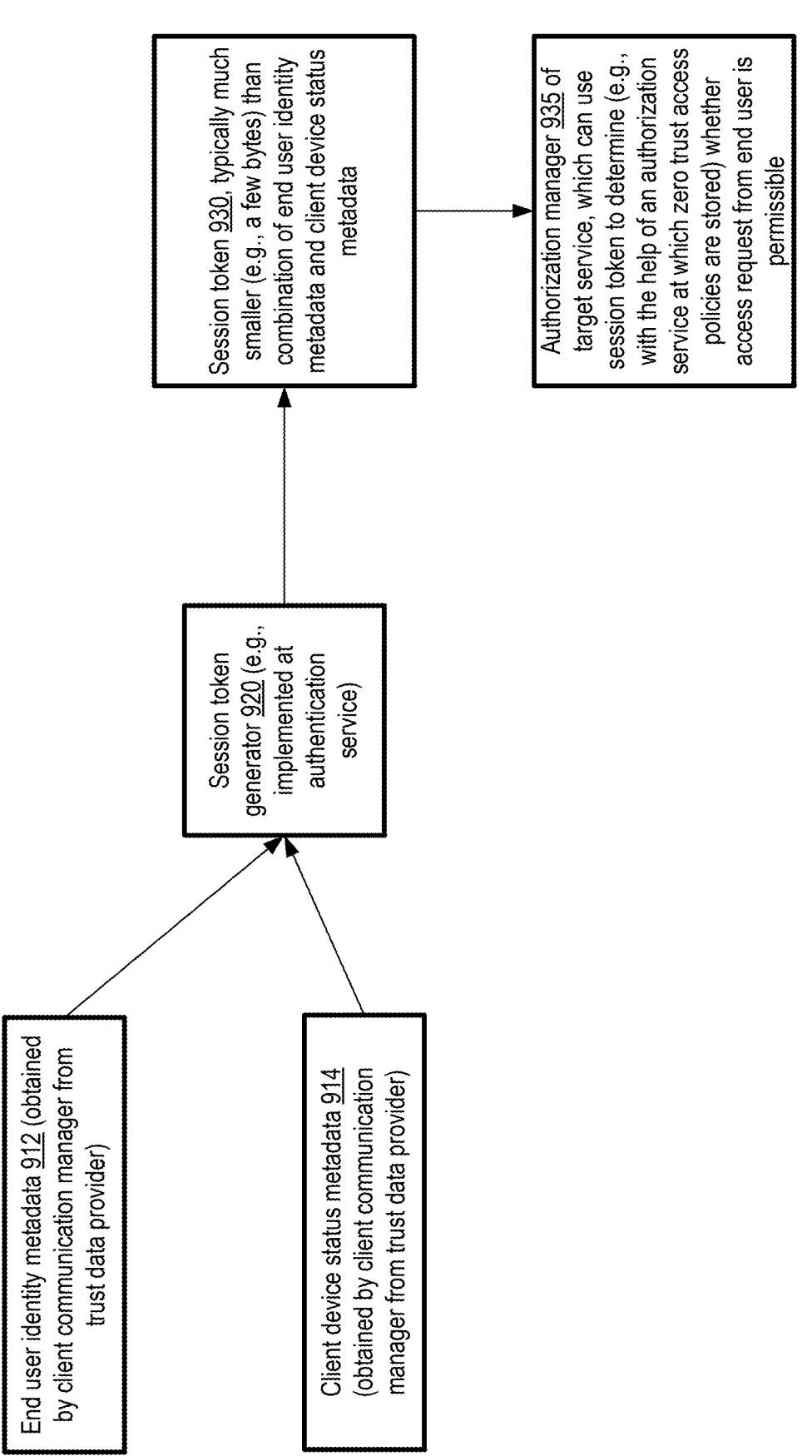

*FIG. 9*

End user identity metadata 912 (obtained by client communication manager from trust data provider)

Client device status metadata 914 (obtained by client communication manager from trust data provider)

Session token generator 920 (e.g., implemented at authentication service)

Session token 930, typically much smaller (e.g., a few bytes) than combination of end user identity metadata and client device status metadata Authorization manager 935 of target service, which can use session token to determine (e.g., with the help of an authorization service at which zero trust access policies are stored) whether access request from end user is permissible Establish a distributed logical tunneling intermediary (LTI) for transmission of packets between a set of client devices and a target service implemented using cloud computing resources; the target service has an associated authorization manager for authorizing accesses to a set of destination resources using a target service-specific authorization workflow, and an associated encapsulation protocol processing agent (EPPA)    1301

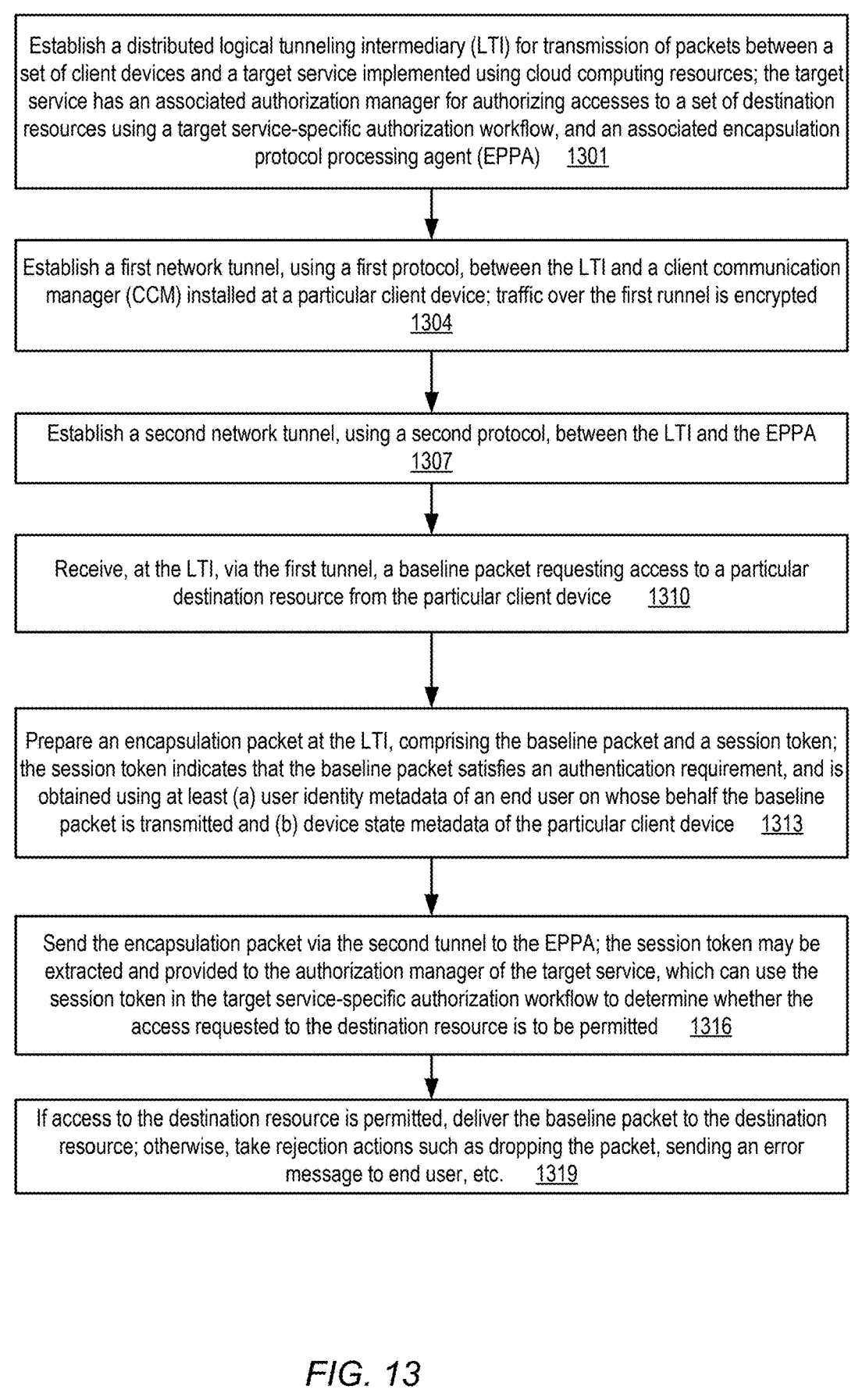

Establish a first network tunnel, using a first protocol, between the LTI and a client communication manager (CCM) installed at a particular client device; traffic over the first tunnel is encrypted
1304

Establish a second network tunnel, using a second protocol, between the LTI and the EPPA
1307

Receive, at the LTI, via the first tunnel, a baseline packet requesting access to a particular destination resource from the particular client device    1310

Prepare an encapsulation packet at the LTI, comprising the baseline packet and a session token; the session token indicates that the baseline packet satisfies an authentication requirement, and is obtained using at least (a) user identity metadata of an end user on whose behalf the baseline packet is transmitted and (b) device state metadata of the particular client device    1313

Send the encapsulation packet via the second tunnel to the EPPA; the session token may be extracted and provided to the authorization manager of the target service, which can use the session token in the target service-specific authorization workflow to determine whether the access requested to the destination resource is to be permitted    1316

If access to the destination resource is permitted, deliver the baseline packet to the destination resource; otherwise, take rejection actions such as dropping the packet, sending an error message to end user, etc.    1319

*FIG. 13*

SECURE CONNECTIVITY FROM EXTERNAL CLIENTS TO DYNAMICALLY CHANGING CLOUD RESOURCE GROUPS

BACKGROUND

More and more applications, including applications that deal with potentially sensitive data, are being migrated to services implemented using resources of cloud provider networks. As a result, sensitive data may be flowing between cloud resources and external client-side devices frequently. Some traditional security models, which require only occasional permission checks, may be insufficient to protect sensitive application data to the extent desired by the application owners and end users.

BRIEF DESCRIPTION OF DRAWINGS

FIG. 3 illustrates an example timeline of events associated with securing accesses to a dynamically changing resource group, according to at least some embodiments.

FIG. 4 illustrates example factors which may be used to define dynamic resource groups to which accesses are secured using group access endpoints, according to at least some embodiments.

FIG. 7 is a flow diagram illustrating aspects of operations, pertaining to securing accesses to dynamically changing groups of resources using group access endpoints, according to at least some embodiments.

FIG. 9 illustrates a technique in which session tokens obtained at a tunneling intermediary may be used during authorization workflows coordinated at target services, according to at least some embodiments.

FIG. 13 is a flow diagram illustrating aspects of operations, pertaining to configuration and use of a tunneling intermediary service to secure accesses to resources of target services, according to at least some embodiments.

Figure 1:
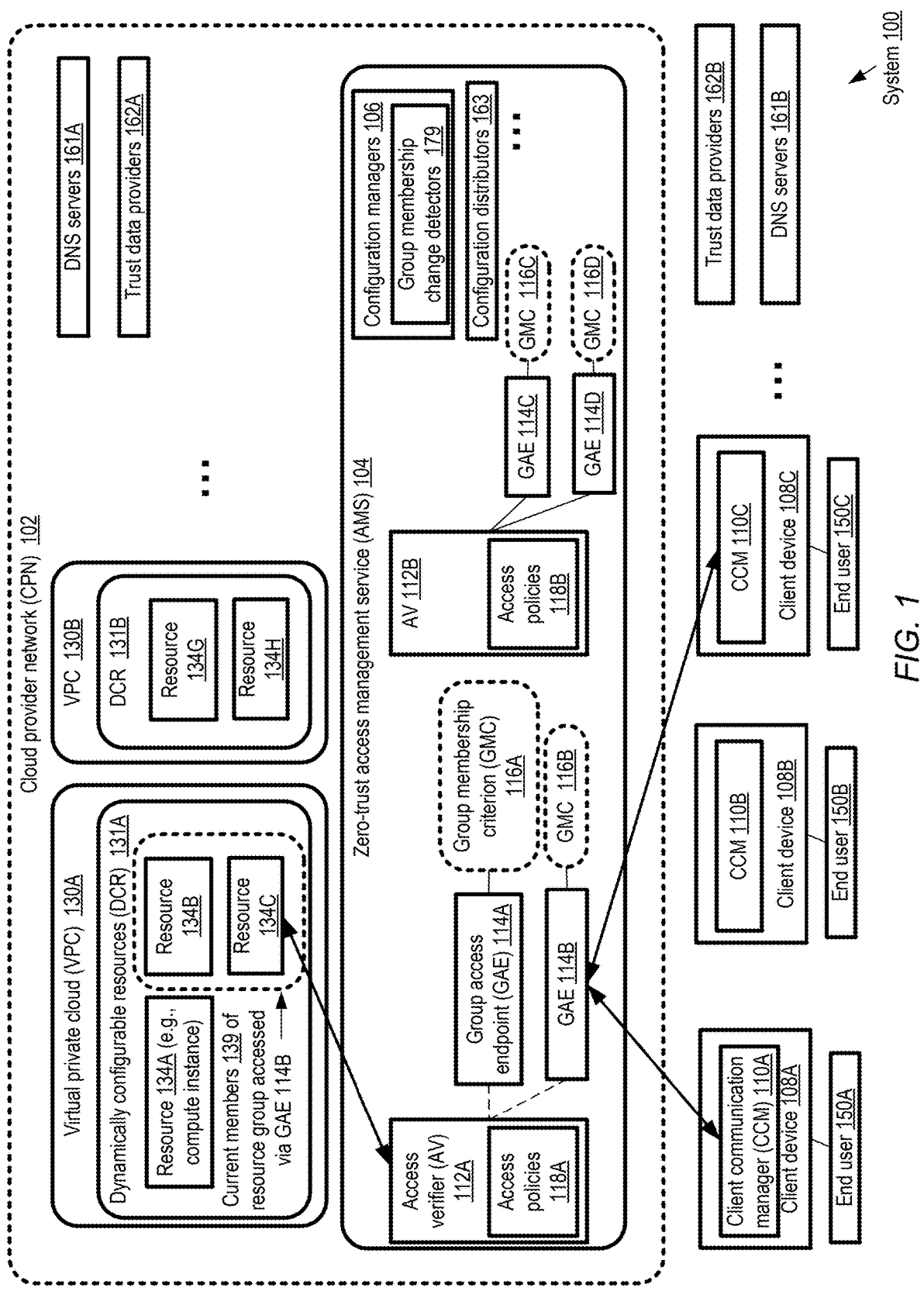
FIG. 1 illustrates an example system environment in which accesses from client devices to dynamically changing resource groups at cloud computing environments may be secured using group access endpoints, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

Many cloud-based resources can be used to generate, transmit, store and/or process sensitive data. To help ensure the security of the data and the applications, a security model referred to as "Zero Trust" (ZT) can be employed instead of, or in addition to, traditional approaches towards handling data security. ZT is based on the idea that access to data should not be solely based on network location or once-per-session evaluation of security criteria. ZT requires users and systems to strongly and continually prove their identities and trustworthiness and enforces fine-grained identity-based authorization rules before allowing them to access applications, data, and other systems.

The present disclosure relates to methods and apparatus for implementing the ZT model for various kinds of network traffic flows using cloud-based resources. Depending on the use cases or preferences of customers whose data is to be secured, several types of approaches can be used. In one approach, a customer such as an owner or administrator of a virtual private cloud (VPC) can control accesses, via group access endpoints, from client computing devices (such as end user laptops or mobile devices) to dynamically changing groups of resources (such as virtual machines which may be launched, terminated or re-configured within a VPC), without the customer having to take specific security-related actions each time a resource change occurs. In this first approach, authentication workflows as well as authorization workflows for access requests from client devices external to the cloud can be performed at a ZT access management service (AMS) in accordance with access policies defined by the customer. The AMS can include a collection of access verifiers (sometimes referred to as AMS instances), each implemented using software run at one or more computing devices, which can authenticate and authorize access requests from client devices. Authentication and/or authorization operations can be performed for multiple (or all) packets sent during a given communication session, based for example on updated state information of the client devices. The customer can create a group access endpoint (GAE) via programmatic interfaces of the AMS, define group membership criteria for various resource groups (e.g., using logical predicates or ranges of network addresses) and programmatically associate one or more groups and access policies with the GAE and an access verifier. Some resources can subsequently become new members of a resource group, or leave the resource group, as a result of automated or customer-requested configuration changes. Because of the group's definition and association with the GAE, traffic directed to the resources of the group from client devices can be sent via the GAE even if the resources were not members of the group (or did not even exist) at the time that the group membership criteria were specified. Metadata enabling the traffic to be directed to the new group members via the GAE (such as Domain Name Service (DNS) records for the new group members and/or associated Internet Protocol (IP) addresses) can be automatically distributed to client communication manager (CCM) software installed on client devices when group membership changes are detected. If needed based on changing client traffic levels, the underlying resources used for implementing GAEs and/or access verifiers can be scaled up or down automatically. Furthermore, GAEs and/or access verifiers can be configured to be highly available to avoid single points of failure.

If a customer of a cloud computing environment wishes to implement more customized domain-specific authorization workflows, without relying on a single service to perform both authentication and authorization, a different approach can be taken. A tunneling intermediary service (TIS) of the cloud computing environment can be used to authenticate access requests which are to be sent to a target application or target service implemented in the cloud, with authorization being performed at the target application or service. Two types of network tunnels can be used: a first type of tunnel for communications between CCMs at client devices and logical tunneling intermediaries (LTIs) of the TIS, and a second type of tunnel for communication between the LTIs and the target services. A given LTI can comprise software run at one or more computing devices. If an access request from a client request is successfully authenticated by an LTI based on an access policy, a token indicating the successful authentication can be obtained by the LTI. The token can then be sent along with the original client request via the second type of tunnel to an encapsulation protocol processing agent of the target service. At the target service, the token can be used as part of a domain-specific authorization workflow if needed. In effect, the second approach can be used to offload authentication responsibilities from numerous target services implemented in the cloud, while retaining the ability to customize authorization workflows in a target service dependent way. A given target service can in some cases include virtual appliances, such as virtual firewall appliances which limit accesses from the client devices to unsafe resources in the public Internet, or virtual Domain Name Service (DNS) appliances which block DNS resolution of unsafe domains. In such cases, the target service may not be the final destination of the access requests originating at the client devices. If the authorization for a particular access request succeeds at the target service, that access request can be sent on to its final destination (in some cases via the LTI, after the access request has been processed at the target service) such as a device accessible via the public Internet. In other cases, the target service can itself comprise the resources that are the final destinations of the access requests. If needed based on changing client traffic levels, the underlying resources used for implementing LTIs can also be scaled up or down automatically, and LTIs can be configured to be highly available to avoid single points of failure.

As one skilled in the art will appreciate in light of this disclosure, certain embodiments may be capable of achieving various advantages, including some or all of the following: (a) enhancing data and application security for diverse types of network traffic flows by implementing a ZT security model using scalable and efficient cloud-based services and/or (b) enabling custom authorization policies to be implemented for respective cloud-based services or applications while offloading authentication responsibilities to a tunneling intermediary service.

For example, implementations of the present disclosure can address scaling and security challenges of existing approaches by providing a comprehensive zero trust network access solution for both web and non-web applications in cloud environments. A secure tunneling service can abstract away the complexities of authentication and connection management, embedding user and device context into network traffic for downstream policy enforcement. For ephemeral resources, the system can introduce "network endpoints" that can represent entire network segments or individual resources using tags. This allows consistent access policies to be applied even as underlying resources change. The disclosed system can also include a client application for end-user devices and intelligent DNS management to simplify resource discovery and access. By unifying access controls across protocols and accommodating dynamic cloud resources, the system can improve security while reducing operational complexity for IT administrators.

According to some embodiments, a system may include a distributed configuration manager of a cloud computing environment or cloud provider network, and a distributed access verifier (AV) of an access management service (AMS) of the cloud computing environment. The configuration manager as well as the AV may each comprise one or more software programs run on one or more computing devices. The configuration manager may establish a group access endpoint (GAE) at the AMS to enable access, in accordance with a security policy, from a set of client devices (such as end user laptops, desktops, mobile devices etc.) outside the cloud computing environment to a group of resources which satisfy a group membership criterion. In at least one embodiment, for example, the group of resources (which may include compute instances or virtual machines) may be part of an isolated virtual network or virtual private cloud (VPC) of a virtualized computing service (VCS) of the cloud computing environment. Individual ones of the resources may be assigned a private address within a range of addresses selected by a VCS customer for the VPC. The AV may be programmatically associated or attached to the GAE, e.g., in response to a programmatic request from the VCS customer.

In at least some embodiments, individual ones of the client devices maybe required to have client communication manager (CCM) software, provided by or downloadable from the cloud computing environment, installed so that end users of the client devices to communicate securely with the resource group in accordance with ZT principles. The configuration manager may transmit configuration metadata to a CCM installed on such a client device, enabling connectivity to be established between the CCM and the GAE. The metadata may comprise addressing information in various embodiments, such as a public Internet Protocol (IP) address assigned by the configuration manager to the GAE, a public IP address (such as an IP version 6 address) assigned by the configuration manager to the CCM, Domain Name Service (DNS) records containing names and addresses of resource group members, and so on.

At various points in time, configuration changes initiated at the cloud computing environment (e.g., at the request of customers), may cause changes to the membership of the resource groups. For example, new compute instances which satisfy the membership criteria may be automatically spun up to run a software container needed for an application, IP addresses of compute instances or virtual network interfaces of compute instances may be changed, and so on. In various embodiments, the configuration manager or another component of the cloud computing environment may detect that, as a result of a configuration change, a particular resource (which did not satisfy the group membership criterion earlier, e.g., at the time that the criterion was defined) now satisfies the group membership criterion. In response to the determination that there is now a new resource group member, in some embodiments the configuration manager may generate a DNS record comprising addressing information for the particular resource. The DNS record may include a DNS name generated by the configuration manager for the new group member, and may include a public network address assigned to the new group member by the configuration manager. The DNS record may be propagated to one or more DNS servers accessible from the CCM of the client device, and/or sent to the CCM by the configuration manager in different embodiments.

An end user of a client device may cause (e.g., by issuing a secure shell (ssh) command, or a remote desktop protocol (RDP) command) a network packet directed to the new resource group member (e.g., with a destination address which was indicated in the DNS record) to be generated in various embodiments. The packet may not be generated by the end user via a web browser in at least some embodiments, and may not be sent via a web services protocol such as HTTP (HyperText Transfer Protocol). Because the destination resource is a member of the group for which the GAE was established, the CCM of the client device may transmit the packet to the GAE via a secure network channel in various embodiments. In at least one embodiment, the secure network channel between the CCM and the GAE may be established (using the metadata which was sent to the CCM by the configuration manager) in advance of any data traffic being generated by the end user. For example, in some implementation, when the end user logs on (e.g., at the start of a business day) to the client device at which the CCM is installed, the CCM may automatically create a secure channel to the GAE using a protocol similar to a VPN (Virtual private Network) protocol, without receiving an explicit request from the end user for establishment of the secure channel via VPN or any other protocol.

When the packet is sent to the GAE by the CCM, it may be obtained and processed at the AV associated with the GAE in various embodiments. For example, in at least some embodiments, the AV may determine, using the security policy, whether the packet satisfies authentication and authorization requirements for delivery to the destination resource to which the packet was directed. In various embodiments, the AV may make this decision based at least in part on (a) identity metadata of the end user on whose behalf the packet is being transmitted, obtained at the AV from the CCM and (b) device status metadata pertaining to the client device from which the packet was sent, obtained at the AV from the CCM. If the packet satisfies the requirements, it may be delivered to the destination resource. Otherwise, the packet may be dropped, an error message may be logged and/or sent to the client device for presentation to the end user, and/or other packet rejection-related actions may be taken in different embodiments.

In at least some embodiments, the customer on whose behalf the GAE is established may indicate, e.g., via programmatic interfaces of an AMS, a DNS sub-domain which is to be used to generate DNS names for resources satisfying the group membership criterion. The GAE may be established in response to a programmatic request directed to the AMS in some embodiments. In at least some embodiments, the customer may use the programmatic interfaces of the AMS to specify trust data sources from which the CCMs may obtain device state information which is used by the Avs for authentication and/or authorization workflows. In at least one embodiment, the AMS may implement a programmatic interface which can be used by a customer to obtain a current list of members of the resource group associated with a GAE.

In some embodiments, group membership criterion for a GAE's resources may be indicated by a customer by specifying a CIDR (Classless Inter-Domain Routing) block, such that any resource which happens to be assigned an address (such as a VPC private address) within the block automatically becomes a member of the group. In some embodiments, tags may be used to specify group membership—e.g., a VCS customer may indicate that if a compute instance CI1 is assigned (e.g., based on programmatic input from the customer) a tag "TagA", CI1 automatically becomes a member of a resource group RG1 associated with GAE GAE1, while if a compute instance CI2 is assigned a tag "TagB", CI2 automatically becomes a member of a resource group RG2 associated with a different GAE GAE2. In some embodiments, group membership criteria may be defined in terms of performance properties (e.g., the equivalent of "any resources which have more than N1 virtual or physical CPUs are in group RG1, and other resources are in group RG2") and/or functional or software capabilities (e.g., the equivalent of "any resources which run application A1 or operating system O1 are in group RG1").

In at least some embodiments, the cloud computing environment may implement subscription service for obtaining notifications of various types of configuration changes, including configuration changes which can result in changes to GAE resource group membership. A group membership change detector associated with an AMS may subscribe to the service to obtain notifications of such changes, and use filters to determine whether any of the changes for which notifications have been received impact group membership for individual GAEs.

In at least one embodiment, authentication and/or authorization checks may be performed for multiple (or all) packets of various packet flows. For example, the device status of the client device from which the packet flow originates may change over time, and the updated device status may be obtained at the AV and used to perform such checks.

According to some embodiments, a system may include a distributed configuration manager of a cloud computing environment or cloud provider network, and a set of computing resources of the cloud computing environment. The configuration manager may establish a logical tunneling intermediary (LTI) for transmission of packets between a set of client devices and a target service implemented at least in part using the set of computing resources. Metadata pertaining to the LTI may be stored in a tunneling intermediary service (TIS) of the cloud computing environment in some embodiments. The target service may comprise an authorization manager responsible for authorizing accesses requested from the set of client devices to a set of destination resources, e.g., in accordance with a domain-specific authorization workflow selected by an owner, administrator or customer of the target service. The configuration manager and the LTI may each comprise software run on one or more computing devices.

The LTI may establish a first network tunnel, using a first protocol, to a client communication manager (CCM) installed at a particular client device of the set of client devices in various embodiments. The traffic sent over the first tunnel may be encrypted in at least some embodiments. The LTI may establish a second tunnel, using a second protocol which differs from the first protocol, with an encapsulation protocol processing agent (EPPA) of the target service.

The LTI may receive, via the first tunnel, a baseline packet originating at a client device, comprising a request to access one of the destination resources in various embodiments. The LTI may obtain a session token corresponding to the baseline packet, include the session token in an encapsulation packet containing the baseline packet, and send the encapsulation packet to the EPPA via the second tunnel in some embodiments. In some implementations, the session token may be included in an encapsulation packet header, while the baseline packet may be contained in a payload portion of the encapsulation packet. In at least one embodiment, an identifier of the CCM, such as an IP address assigned to the CCM by the configuration manager and/or a public IP address assigned to the client device may be included in an encapsulation packet header. The session token may indicate that the baseline packet satisfies an authentication requirement in some embodiments, but may not indicate that the baseline packet has satisfied an authorization requirement with respect to the destination resource. In at least some embodiments, the session token may be generated based at least in part on (a) user metadata of an end user of the client device, on whose behalf the baseline packet is transmitted, and (b) device state information of the client device.

The EPPA that receives the encapsulation packet may cause at least the session token to be delivered to the authorization manager of the target service. The authorization manager may utilize the session token in a target service-specific or domain-specific authorization workflow to determine whether the baseline packet satisfies an authorization requirement associated with the destination resource in various embodiments. If the authorization requirements are satisfied, the baseline packet may be delivered to the destination. Otherwise, any of a number of rejection actions may be taken in different embodiments, e.g., the packet may be dropped, an error message may be sent to the end user, and so on. In some embodiments, EPPAs may be referred to as packet processing agents.

In at least one embodiment, the LTI may comprise multiple nodes run at respective compute instances of a VCS of the cloud provider network. The number of nodes may be chosen by the configuration manager based at least in part on performance requirements of traffic which is to be processed at the target service for the set of destinations. In some embodiments, the nodes of an LTI may be distributed across multiple availability zones to enable fault tolerance.

In some embodiments, the destinations to which the traffic originating at the set of client devices is directed may be within the target service itself. In other embodiments, the destinations may comprise resources in the public Internet, or other resources external to the cloud computing environment. In some embodiments, the target service may comprise a set of virtual appliances, with individual ones of the virtual appliances comprising software running at one or more computing devices. In one such embodiment, an LTI may be programmatically associated with a particular virtual appliance, and at least a portion of the encapsulation packets prepared by the LTI may be sent to that particular virtual appliance by the EPPA. In some embodiments, the virtual appliances of the target service may comprise virtual firewall appliances configured to prohibit access from the client devices to unsafe destinations in the public Internet. In at least one embodiment, the virtual appliances of the target service may comprise virtual DNS servers configured to determine, using a security criterion, whether a DNS request indicated in a baseline packet is to be processed or not. As such, a virtual DNS server may permit some DNS requests (which satisfy the security criterion) from the client devices to be processed, while preventing other DNS requests (which do not satisfy the security criterion) from the client devices from being processed. In some embodiments, a virtual DNS server may itself process a DNS request which satisfies the security criterion.

According to one embodiment, a session token may be generated at the time that the first tunnel is established on behalf of a particular end user and refreshed or updated later during the lifetime of the first tunnel (e.g., in response to detecting that the state of the client device has changed). In at least some embodiments, the session token may be much shorter than the combination of end user identity information and client device state information which was used to generate the session token—e.g., the combination of end user identity information and device state information may take up N bytes, while the session token itself may take up M bytes, where M is less than N. As such, transmission of the session token along with individual baseline packets may be much more efficient than transmitting the user identity and device state information along with the individual baseline packets. In at least one embodiment, the cloud computing environment may implement a programmatic interface which can be invoked (e.g., by an authorization manager of the target service) to obtain, given a session token, the user identity information and/or the device state information corresponding to the session token.

As indicated earlier, in some embodiments, access management services (AMSs) and/or tunneling intermediary services (TISs) may be implemented at a cloud provider network. A cloud provider network or cloud computing environment (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS of a cloud computing environment may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS may be implemented at one or more data centers, edge locations and/or extension locations of the provider network in different embodiments. A VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network, including the VCS, an AMS, or a TIS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which accesses from client devices to dynamically changing resource groups at cloud computing environments may be secured using group access endpoints, according to at least some embodiments. As shown, system 100 may include resources and artifacts of a cloud provider network 102 at which a zero-trust access management service (AMS) 104 is implemented. The cloud provider network may implement a virtualized computing service (VCS), which can be used by customers to set up isolated virtual networks referred to as virtual private clouds (VPCs), such as VPC 130A and VPC 130B. A VPC may comprise a collection of networked resources (including, for example, compute instances or virtual machines) allocated to a given VCS customer, which are logically isolated from (and by default, inaccessible from) resources allocated for other clients in other VPCs. The customer on whose behalf a VPC is established may be granted substantial flexibility regarding network configuration for the resources of the VPC—e.g., private IP addresses for compute instances may be selected by the customer without having to consider the possibility that other resources within other VPCs may have been assigned the same IP addresses, subnets may be established within the VPC, security rules (sometimes referred to as security groups) may be set up for incoming and outgoing traffic with respect to the VPC, and so on. In at least some embodiments, at least a subset of the resources (such as compute instances or virtual machines) within a VPC may be dynamically created, re-configured or deleted. For example, the customer may set up auto-scaling rules to launch new compute instances as the workload of a given application implemented at a VPC increases or terminate instances if the workload decreases, or an application running on one of the compute instances may launch additional instances for running short-lifetime software containers to perform application sub-tasks, and so on.

A customer may submit access policies that can be used at the CPN 102 to implement a zero-trust model for traffic originating at a set of client devices (e.g., laptops, desktops, mobile devices and the like) outside the CPN (e.g., at office premises of an organization whose employees are to use VPC resources) in the depicted embodiment. The access policies, which may indicate authentication and authorization requirements for accessing VPC resources using a variety of protocols or commands including ssh or RDP, may be enforced or applied by a collection of access verifiers (AVs) of a zero-trust AMS 104 in at least some embodiments. For example, AV 112A may apply access policies 118A pertaining to accesses from client devices 108 (e.g., client device 108A, client device 108B, or client device 108C) to resources within VPC 130A, while AV 112B may apply access policies 118B to accesses from the client devices to resources within VPC 130B in the depicted scenario. The AVs 112 may be set up by configuration managers 106 in response to programmatic requests from customers of the CPN in some embodiments. Individual ones of the client devices 108A may have respective client communication manager (CCM) software, provided from or downloadable from the CPN, in the depicted embodiment. For example, CCM 110A may run on client device 108A utilized by end user 150A to access resources in one or more VPCs, CCM 110B may run on client device 108B utilized by end user 150B to access resources in one or more VPCs, and CCM 110C may run on client device 108C utilized by end user 150C to access resources in one or more VPCs.

As indicated above, a VPC may comprise dynamically configurable resources (DCRs) in some embodiments. For example, DCR 131A of VPC 130A may comprise resource 134A, resource 134B and resource 134C at some point in time, which DCR 131B of VPC 130B may comprise resources 134G and 134H. Resources within the DCRs may be assigned network addresses from address ranges chosen for the corresponding VPCs by the VPC owners (the CPN customers on whose behalf the VPCs are established). To help simplify enforcement of customer-specified access policies for collections of dynamically configured resources of VPCs, instead of having to perform resource-specific actions, CPN customers may use programmatic interfaces to request the establishment of group access endpoints (GAEs) in the depicted embodiment. Configuration managers 106 may establish GAEs such as GAE 114A, GAE 114B, GAE 114C or GAE 114D. One or more GAEs may be programmatically associated with an AV, such that the computations required to enforce access policies for the corresponding group of VPC resources are performed at the AV. An individual GAE, to which an IP address may be assigned by a configuration manager 106 when the GAE is created, may be used to transmit traffic between a specified set of VPC resources that satisfy a group membership criterion (GMC), and some set of client devices in accordance with a particular access policy 118 enforced by the AV programmatically associated with the GAE. For example, GMC 116A may be specified by a CPN customer to indicate resources whose traffic is to be sent using GAE 114A, GMC 116B may be specified to indicate resources whose traffic is to be sent using GAE 114B, GMC 116C may be specified to indicate resources whose traffic is to be sent using GAE 114C, and GMC 116D may be specified to indicate resources whose traffic is to be sent using GAE 114C. The set of VPC resources that happen to satisfy a given GMC may change over time, e.g., due to launches/terminations of compute instances, changes of IP addresses of compute instances or virtual network interfaces, programmatic attachment/detachment of virtual network interfaces to compute instances, and so on. At one point of time, the current members 139 of a resource group accessed via GAE 114B (e.g., by end users 150A or 150B) may comprise resources 134B and 134C of VPC 130A; at a later point of time, additional resources may qualify for membership of the group defined via GMC 116B, or some members of the group may no longer qualify.

In the embodiment shown in FIG. 1, configuration managers 106 may cause configuration metadata (e.g., IP addresses assigned to GAEs, DNS names assigned to GAEs, etc.) enabling establishment of connectivity to GAEs to be transmitted to various CCMs 110 at the client devices 108. In at least one embodiment, a set of configuration distributors 163 may be used to provide the configuration metadata to the CCMs. In at least some embodiments, the configuration metadata provided to the CCMs may include information about trust data providers 162A within the CPN, trust data providers 162B outside the CPN, DNS servers 161A within the CPN and/or DNS servers 161B outside the CPN. The trust data providers may, for example, be used by CCMs to obtain identity information of end users 150 and/or device state information of the client devices 108, enabling the CCMs to include the identity and device state information in messages sent to the GAEs. Using at least a portion of the configuration metadata, secure networking channels may be established between a given CCM and a given GAE, and subsequently used to send encrypted packets from end users 150 to VPC resources associated with the GAEs in the depicted embodiment.

In at least some embodiments, when a configuration change results in a VPC resource becoming a member of a resource group associated with a GAE, a number of operations may be performed automatically in the depicted embodiment. One or more group membership change detectors 179 (which may be implemented as part of configuration managers 106) may detect such events and trigger the operations. In one such operation, a DNS record for the new group member (e.g., comprising a newly generated DNS name for the resource, and an IP address such as a public IP version 6 address assigned to the resource for communication via the CCMs) may be generated in some embodiments. In some cases, the DNS name may be generated using a DNS sub-domain specified by a CPN customer on whose behalf the VPC is set up. In another automatically initiated operation, in some embodiments, the DNS record may be propagated to one or more DNS servers 161A or 161B accessible from client devices 108. In one embodiment, the IP address assigned to the resource as a result of its membership in the resource group may differ from other IP addresses assigned to the resource, such as a private VPC IP address. In at least some embodiments, at least some of the content of the DNS record may be distributed to one or more CCMs.

An end user 150 logged in to a client device 108 may attempt to access a VPC resource associated with a given GAE using any of a variety of protocols in different embodiments, such as but not limited to ssh, RDP, remote database access protocols, and the like. Some of the protocols may not be web service protocols and may not require the use of a web browser in the depicted embodiment. The destination address of the packet may comprise the IP address assigned to the VPC resource when it became a member of the resource group of the GAE in the depicted embodiment; as such, a portion of contents of the DNS record created for the VPC resource when it satisfied the GMC of the GAE may be used as the destination address. For at least some of the protocols, the end user's traffic may be sent by the CCM on the client device via the secure networking channel established with the GAE.

At the AMS, the packet sent to the GAE from the CCM may be processed by the AV which is programmatically associated with the GAE. For example, a packet generated on behalf of end user 150A, with a destination address assigned to resource 134C based on resource 134C's membership in a resource group defined by GMC 116B of GAE 114B, may be sent in encrypted form via a secure networking channel established between CCM 110A and GAE 114B, and processed at AV 112A. The AV may determine, based on an applicable access policy 118A, whether the packet satisfies authentication and authorization requirements, and determine whether the packet should be sent on to its destination. In at least one embodiment, the access policy may be applied using trust data pertaining to the identity of the end user 150 on whose behalf the packet is being sent, and/or the client device 108 from which the packet is sent. In various embodiments, such trust data may be obtained from one or more trust data providers 162A or 162B by the CCM, and included in a version of the packet which is sent from the CCM to the GAE. In at least one embodiment, the specific trust data providers to be used for traffic from a set of client devices to a set of VPC resources may be indicated by the CPN customer on whose behalf the VPC was established. If the authentication and authorization requirements are satisfied, the packet may be sent to its intended destination resource 134 in a VPC in the depicted embodiment. Otherwise, in at least some embodiments, the packet may be dropped, the fact that the packet was dropped (and the reason why it was dropped) may be logged at the AMS, and/or an error message may be sent via the CCM to the end user on whose behalf the packet was sent.

Figure 2:
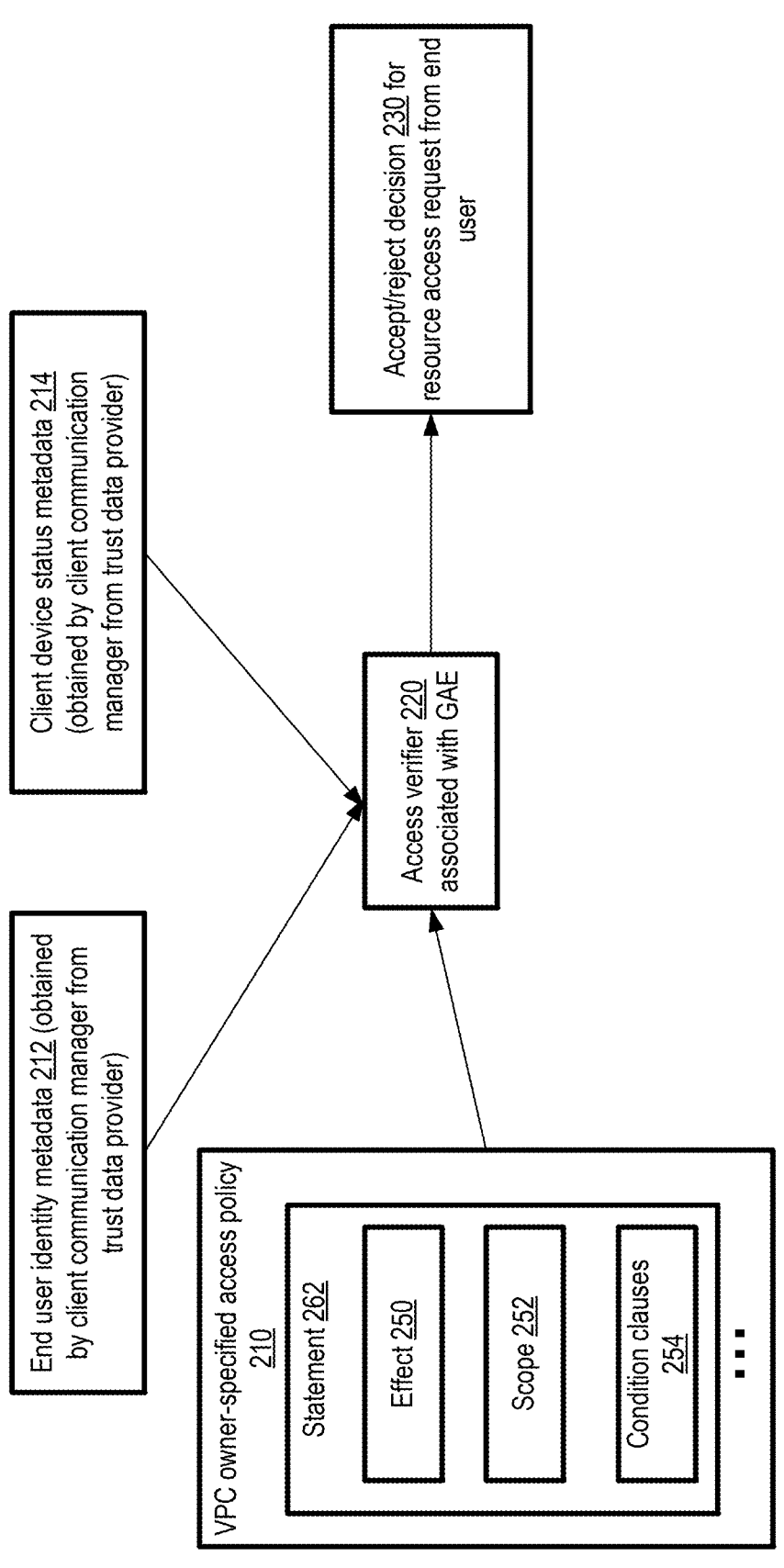
FIG. 2 illustrates examples of metadata which may be utilized at an access verifier to determine whether to accept requests to access resources at a cloud computing environment, according to at least some embodiments.

FIG. 2 illustrates examples of metadata which may be utilized at an access verifier to determine whether to accept requests to access resources at a cloud computing environment, according to at least some embodiments. In the embodiment shown in FIG. 2, a customer of a cloud provider network may request the establishment of VPCs, and then specify access policies to be used to control access to resources within the VPCs. A VPC owner-specified access policy 210 may include one or more policy statements 262, with individual statements indicating an effect 250, a scope 252 and one or more condition clauses 254. In some embodiments, the access policies may be written by the customer using a policy language specified by the operator of the cloud provider network. The effect 250 may indicate whether the policy statement covers a permit (allow) action with respect to a given set of traffic, or a forbid (deny) action in some embodiments. The scope 252 may indicate one or more principals (e.g., individual identifiers or account identifiers), one or more actions (e.g., read or write operations), and one or more resources with respect to which the actions are being attempted. The condition clauses may indicate one or more predicates applicable to the context of the access request being evaluated using the policy. Such predicates may be expressed in terms of trust data obtained from one or more trust data providers. Access policies may be referred to as security policies in some embodiments.

In at least some embodiments, end user identity metadata 212 may be obtained from a trust data source by a CCM of a client device from which access requests of the end user are transmitted. In the depicted embodiment, client device status metadata 214 may also be obtained from one or more trust data sources by the CCM and sent along with a packet containing the end user's access request to a GAE associated with an access verifier 220 (similar in features and functionality to access verifiers 112 shown in FIG. 1) responsible for enforcing the policy 210. The access verifier may then apply policy 210, using the end user identity metadata 212 and the client device status metadata 214, to make an accept/reject decision 230 for the resource being accessed by the end user. The access verifier may be responsible for implementing both an authentication workflow and an authorization workflow for packets sent on behalf of end users to VPC resources in accordance with a zero-trust methodology in the depicted embodiment, e.g., with the workflows being re-conducted periodically (or for each packet) during a given communication session. The access policy 210 may thus be referred to as a zero-trust access policy.

FIG. 3 illustrates an example timeline of events associated with securing accesses to a dynamically changing resource group, according to at least some embodiments. At time t1 along timeline 300, as indicated in element 354, a resource owner RO1 (such as the CPN customer at whose request a VPC was established) may specify group membership criteria for a resource group G1 of the VPC, associated with a particular GAE and AV, and a zero-trust access policy ZTAP1 to be applied for traffic directed to (current and future) members of G1. At t1, the members may include resources R1, r2 and R3 in the depicted embodiment, and no changes to G1 membership occur between t1 and t2.

Between t1 and t2, ZTAP1 enforcement for access attempts directed to current members R1, R2 and R3 of G1 may be performed in the depicted embodiment, without the resource owner having to take any per-resource steps as indicated in element 355. For example, configuration metadata such as a DNS record for each resource of G1 may be created and automatically propagated shortly after t1 and packets subsequently sent using contents of the configuration metadata from CCMs to the GAE may be evaluated based on ZTAP1 statements by the AV associated with the GAE.

At time t2, as indicated in element 356, one or more configuration changes affecting G1 membership may occur in the depicted embodiment. For example, new compute instances may be launched, IP addresses or tags assigned to running compute instances or virtual network interfaces of compute instances may be changed, and so on. As a result, G1 may now have members R1, R3 and R4.

As shown in element 357, after t2, ZTAP1 may be automatically enforced for the updated membership of G1, again without RO1 having to take any steps per resource. As needed, configuration metadata pertaining to changes in the membership may be created, propagated and/or deleted in the depicted embodiment.

FIG. 4 illustrates example factors which may be used to define dynamic resource groups to which accesses are secured using group access endpoints, according to at least some embodiments. As indicted earlier, a customer of a CPN similar to CPN 102 of FIG. 1 may submit a programmatic request to establish a GAE, indicating the criteria to be used to identify resources whose traffic is to be transmitted via the GAE, with an access policy for the group members being evaluated by the AV with which the GAE is associated.

In some embodiments in which one or more subnets are set up by a VPC owner within a VPC, each of the subnets may be assigned a respective subnet identifier. Such subnet ID(S) 410 may be indicated as a group membership criterion in one embodiment, indicating that any resource created within a subnet to which one of the IDs is assigned automatically becomes a member of the resource group. In at least one embodiment, CIDR block(s) 412 indicating the range of addresses (e.g., private IP addresses assigned within the VPC) of resources which are to be identified as group members may be provided by the resource owner.

According to some embodiments, a customer may specify individual IP addresses 414 as criteria for group membership. In one embodiment, customers may specify tags (e.g., strings) for various resources within their VPCs, and such tag(s) 416 may be specified as indicators of group membership. In some embodiments in which the resource group members include compute instances of a VCS, any of several kinds of properties 418 of the compute instances may be specified to indicate the criteria for group membership. Such criteria may for example include performance-related properties, such as the number and types of virtual or physical CPUs or GPUs of the compute instances, the amount of memory of the compute instances, the persistent storage capacity or networking capacity of the compute instances, etc. in some implementations. In at least one embodiment, functional capabilities of compute instances may be indicated as membership criteria—e.g., whether the compute instance includes a particular software stack capable of running a specified application, whether the host used for the compute instance includes a particular type of hardware accelerator, and so on. In some embodiments, factors such as launch time periods may be used to define resource groups—e.g., compute instance launched in a given VPC between 9 AM and 6 PM on any business day may be categorized as belonging to a resource group. In various embodiments, any logical predicate which can be applied to a cloud provider network resource, and which can be evaluated at the cloud provider network, may be used to define membership of a resource group associated with a GAE.

Figure 5:
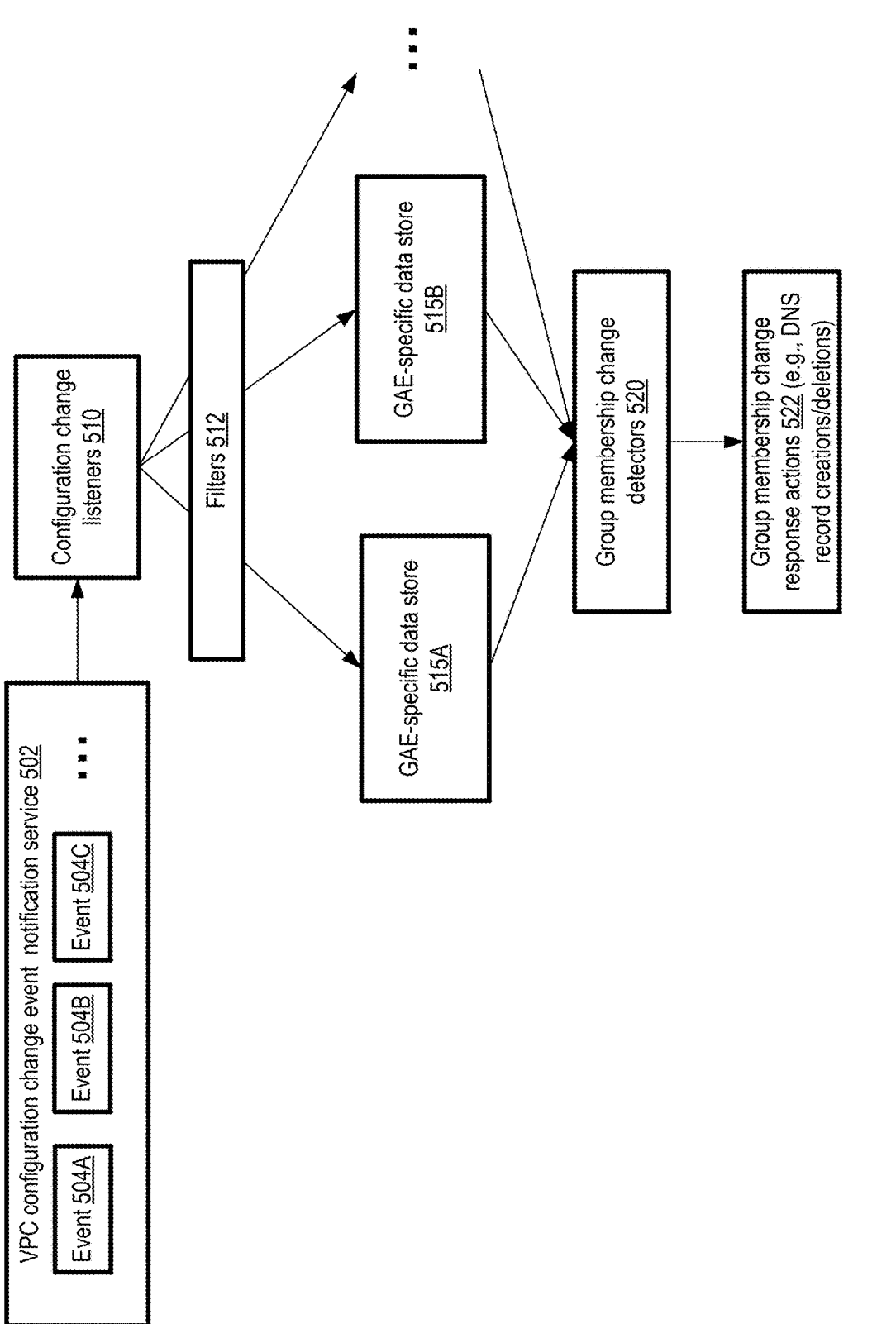
FIG. 5 illustrates an example technique for responding to configuration changes of resource groups to which accesses are secured using group access endpoints, according to at least some embodiments.

FIG. 5 illustrates an example technique for responding to configuration changes of resource groups to which accesses are secured using group access endpoints, according to at least some embodiments. In the depicted embodiment, a cloud provider network may implement a VPC configuration change event notification service 502. Listeners that subscribe to the service may be provided notifications of various types of configuration events such as events 504A, 504B or 504C, using any of several supported notification mechanisms (such as message busses or queues, emails, etc.). Service 502 may also be referred to as a configuration event notifier in some embodiments.

One or more configuration change listeners 510 may be set up as subscribers to service 502 in the depicted embodiment. In at least some embodiments, such listeners may be subcomponents of distributed configuration managers of the CPN, and/or subcomponents of an AMS similar in features and functionality to AMS 104 of FIG. 1. The configuration change listeners 510 may apply filters 512 to select events that are relevant or applicable to various GAEs set up by the AMS in some embodiments. The filters may for example comprise predicates based on the associated VPC names/identifiers of the different GAEs and/or group membership criteria of the different GAEs.

For individual ones of the GAEs, a respective data store such as GAE-specific data store 515A or GAE-specific data store 515B may be set up to store detected configuration changes in the depicted embodiment. One or more group membership change detectors 520 may periodically examine the data stores to identify changes that actually result in changes to group membership in some embodiments. If such changes are found, one or more group membership change response actions 522 may be initiated in various embodiments (such as generation and propagation of new DNS records of the kind mentioned above, and/or deletion of earlier-generated DNS records).

Figure 6:
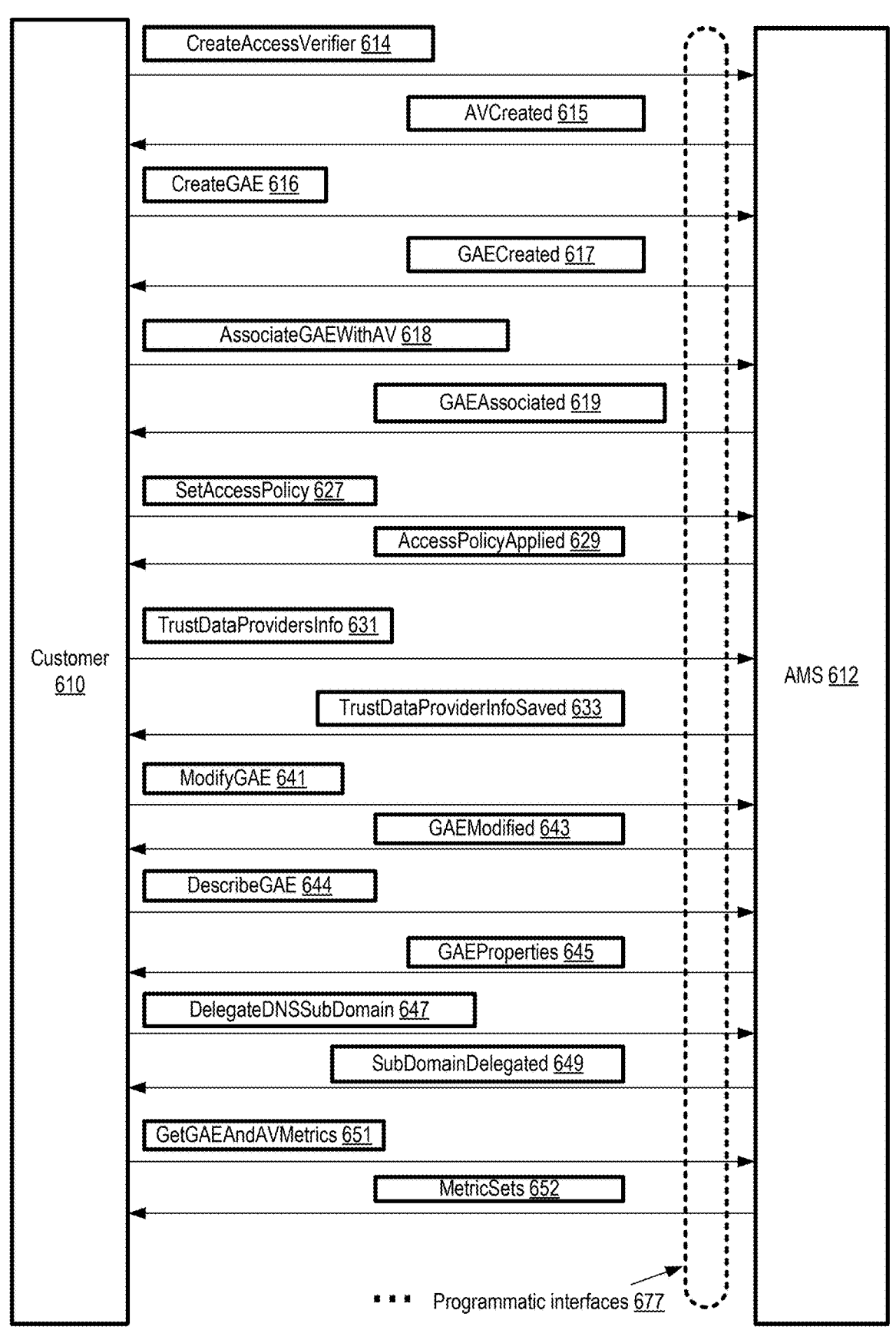
FIG. 6 illustrates example programmatic interactions, associated with securing accesses to dynamically changing groups of resources using group access endpoints, between a client and an access management service, according to at least some embodiments.

FIG. 6 illustrates example programmatic interactions, associated with securing accesses to dynamically changing groups of resources using group access endpoints, between a client and an access management service, according to at least some embodiments. An AMS 612, similar in features and functionality to AMS 104 of FIG. 1, may implement a set of programmatic interfaces 677 in the depicted embodiment, such as one or more web-based consoles, command-line tools, graphical user interfaces and/or APIs. An AMS customer 610 (e.g., an owner of a VPC that wishes to utilize zero-trust security techniques) may utilize the programmatic interfaces to submit requests and information pertaining to securing traffic of their VPC resources and receive corresponding responses. In at least one embodiment, the AMS may be implemented as a constituent service or lower-level service within a VCS, and the VCS may implement at least some of the programmatic interfaces 677.

A customer 610 may submit a CreateAccess Verifier request 614 via programmatic interfaces 677 in the depicted embodiment. In response, an access verifier (AV) comprising one or more nodes (e.g., with each node running on a VCS compute instance) may be configured for traffic associated with the customer's resources, and an AVCreated response message 615 may be sent to the customer.

The customer may submit a CreateGAE request 616 in some embodiments, requesting the establishment of a group access endpoint and specifying group membership criteria for the resources whose traffic is to be transmitted via the endpoint from a set of client devices in accordance with an access policy. In response, a GAE may be created and a GAECreated message 617 may be sent to the customer. In at least some embodiments, configuration metadata enabling secure networking channels to be created between the GAE and CCMs running at the client devices may be transmitted to the CCMs when the GAE is created. In other embodiments, such configuration metadata may be sent later, e.g., in response to configuration update requests from the CCMs and/or in response to association of the GAE with an AV.

An AssociateGAEWithAV request 618 may be sent by the customer in various embodiments, requesting that a specified GAE be programmatically linked or associated with a specified access verifier. Metadata indicating the requested association may be stored at the AMS, and a GAEAssociated message 619 may be sent to the client. In some embodiments a given GAE may be associated with more than one AV specified in the AssociateGAEWithAV request. In various embodiments, multiple GAEs (each with their respective group membership criteria) may be associated with a single AV, e.g., by indicating all the GAEs in the AssociateGAE-WithAV request or submitting multiple such requests.

In some embodiments, an access policy to be enforced on traffic received via one or more GAEs associated with an AV may be submitted via a SetAccessPolicy request 627. The access policy may be saved in a metadata repository of the AMS, and an AccessPolicy Applied message 629 may be sent to the client. In one embodiment, the access policy to be used for traffic of a given GAE may be indicated in the CreateGAE request for that GAE instead of in a separate SetAccessPolicy request.

A TrustdataProvidersInfo message 631 may be sent by a customer in one embodiment, indicating one or more services (which may in some cases be implemented by parties other than the operator of the cloud provider network at which the AMS is implemented) from which identity metadata and/or device status metadata or device state metadata to be used during authentication and/or authorization workflows by the AVs can be obtained. The information about trust data providers may be stores at the AMS, and a TrustDataProviderInfoSaved message 633 may be sent to the customer. At least a portion of the information about the trust data providers may be distributed to CCMs in various embodiments, enabling the CCMs to obtain trust data of various client devices and end users and transmit the trust data to the AVs via the GAEs.

In some embodiments, a customer 610 may send a ModifyGAE request 641 to change one or more properties of a GAE. For example, the group membership criteria of the GAE may be changed, the GAE may be disassociated from one AV and associated with another AV, and so on. A change to the group membership criteria may have similar results as the configuration of additional resources that happen to satisfy the existing group membership criteria in various embodiments—e.g., new DNS records may be generated and propagated. In response to the ModifyGAE request, one or more properties of the GAE may be changed, and a GAEModified message 643 may be sent to the customer.

A customer may submit a DescribeGAE request 644 to the AMS, requesting information about the current properties of a specified GAE in the depicted embodiment. The properties may include the current group membership criteria, the identity of the AV with which the GAE is associated, identifiers (such as DNS names and/or addresses) of the resources that are current members of the GAE's resource group, and so on. A GAEProperties message 645 indicating properties of the GAE may be sent in response to the DescribeGAE request.

In at least some embodiments, as mentioned earlier, a customer may indicate or delegate a DNS sub-domain to the AMS, for use in generating the DNS addresses of new resource group members automatically. A DelegateDNS-SubDomain message 647 indicating the sub-domain may be sent to the AMS in such an embodiment. A SubDomainDelegated message 649 may be sent to the customer in response. Delegating the sub-domain may make it easier for the AMS to generate end-user-friendly DNS names (such as names ending in <myOrganizationUnit>.<mycompany>.com, in which the name of an organization unit such as a department or team name is included in all the DNS names generated) for resources whose traffic is to be transmitted via GAEs set up for the customer. In some embodiments, subsequent to delegation of a DNS sub-domain, the customer may be provided IP addresses of one or more name servers that can resolve DNS names corresponding to the sub-domain. In at least one embodiment, if the customer does not delegate a sub-domain, the AMS may create its own DNS names for the resources accessed via the GAE, e.g., using a selected string pattern.

The AMS may collect various metrics pertaining to GAEs and AVs in some embodiments, such as the rate at which traffic is transmitted via individual GAEs, changes (if any) over time in the number of resources whose traffic is transmitted via individual GAEs, the number of packets which were rejected at an AV and the reasons for their rejection, and so on. A GetGAEAndAVMetrics request 651 may be sent to the AMS in some embodiments to obtain such metrics. The requested metrics may be sent to the customer in one or more MetricSets messages 652 in the depicted embodiment. In some embodiments, programmatic interactions other than those shown in FIG. 6 may be supported for configuring and using GAEs and AVs.

FIG. 7 is a flow diagram illustrating aspects of operations, pertaining to securing accesses to dynamically changing groups of resources using group access endpoints, according to at least some embodiments. As shown in element 701, a GAE may be created, e.g., at a zero-trust AMS, to enable access from a set of a client devices outside a cloud provider network to a group of resources that satisfy a group membership criterion. End users of the client devices may, for example, use protocols such as ssh or RDP to submit commands or other messages via the GAE to VCS compute instances of the group in various embodiments. The group membership may change dynamically in some embodiments, e.g., due to configuration changes at the VCS. Group membership criteria may be specified in several ways in different embodiments, e.g., as shown in FIG. 4. Any combination of logical predicates which can be evaluated at the AMS to determine whether a given resource is a member of a group may be used to define the group membership in some embodiments.

As shown in element 704, the GAE may be programmatically associated with an access verifier AV of an AMS in various embodiments. The AV may comprise logic to perform authentication and authorization workflows for accesses directed to the resources of the GAE's resource group.

Configuration metadata enabling connectivity to be established between the GAE and client communication manager (CCM) software installed at the client devices may be distributed to the CCMs from the AMS in at least some embodiments (element 707). The CCM software may be provided by, or downloaded from, the cloud provider network in various embodiments.

As a result of a configuration change such as the launch of a compute instance or a change of an IP address assigned to a compute instance, membership of the resource group may change. In at least some embodiments, in response to such a change in membership, a set of actions may be initiated automatically at the AMS (element 710). The actions may include creation and propagation of DNS records indicating that a DNS name assigned to a new member of the group has been assigned a particular public IP address (e.g., an IP version 6 address), deletion of existing DNS records from DNS servers in scenarios in which a resource is no longer a member of the resource group, and so on. In some embodiments, new DNS names for the resources that have joined the resource group may be generated using naming convention that includes the name of a DNS sub-domain delegated to the AMS by the customer on whose behalf the GAE was created.

A packet from of an end user communication originating a particular client device, and intended for delivery to a resource which is a member of the GAE's resource group (such as a resource which has recently become a group member as a result of the detected configuration change), may be sent to the GAE via a secure networking channel established between the device's CCM and the GAE in various embodiments. The intended destination of the packet may be indicated by the end user, for example, as a DNS name (or IP address) assigned to the resource and stored in the DNS record which was generated for the resource when the resource became part of the resource group. The secure networking channel may have been created using the networking metadata propagated earlier to the CCM. The packet directed to the GAE may be obtained at the AV with which the GAE is programmatically associated (element 713). In at least some embodiments, the channel establishment workflow may include receiving, at the AV, an initial set of end user authentication metadata from one or more trust data sources and an initial set of device status metadata from one or more trust data sources.

The AV may perform authentication and authorization workflows for the received packet (element 716). The workflows may involve using (a) current identity metadata of the end user on whose behalf the packet is being sent (b) current device status metadata of the client device from which the packet was sent and (c) a current access policy specified by an owner of the resource group associated with the GAE in some embodiments. Any of these three elements or factors may have changed since the establishment of the secure channel in various embodiments, and the results of the workflows may therefore differ from one packet to another packet of a given packet flow. If the authentication and authorization workflows indicate that delivery of the packet to its intended destination is allowed/permitted, the packet may be sent on to the target in the depicted embodiment (element 719). If the delivery is not permitted, one or more rejection actions may be performed, such as dropping the packet, sending an error message to the end user, generating and storing a log message indicating the reason for the rejection, and so on.

Figure 8:
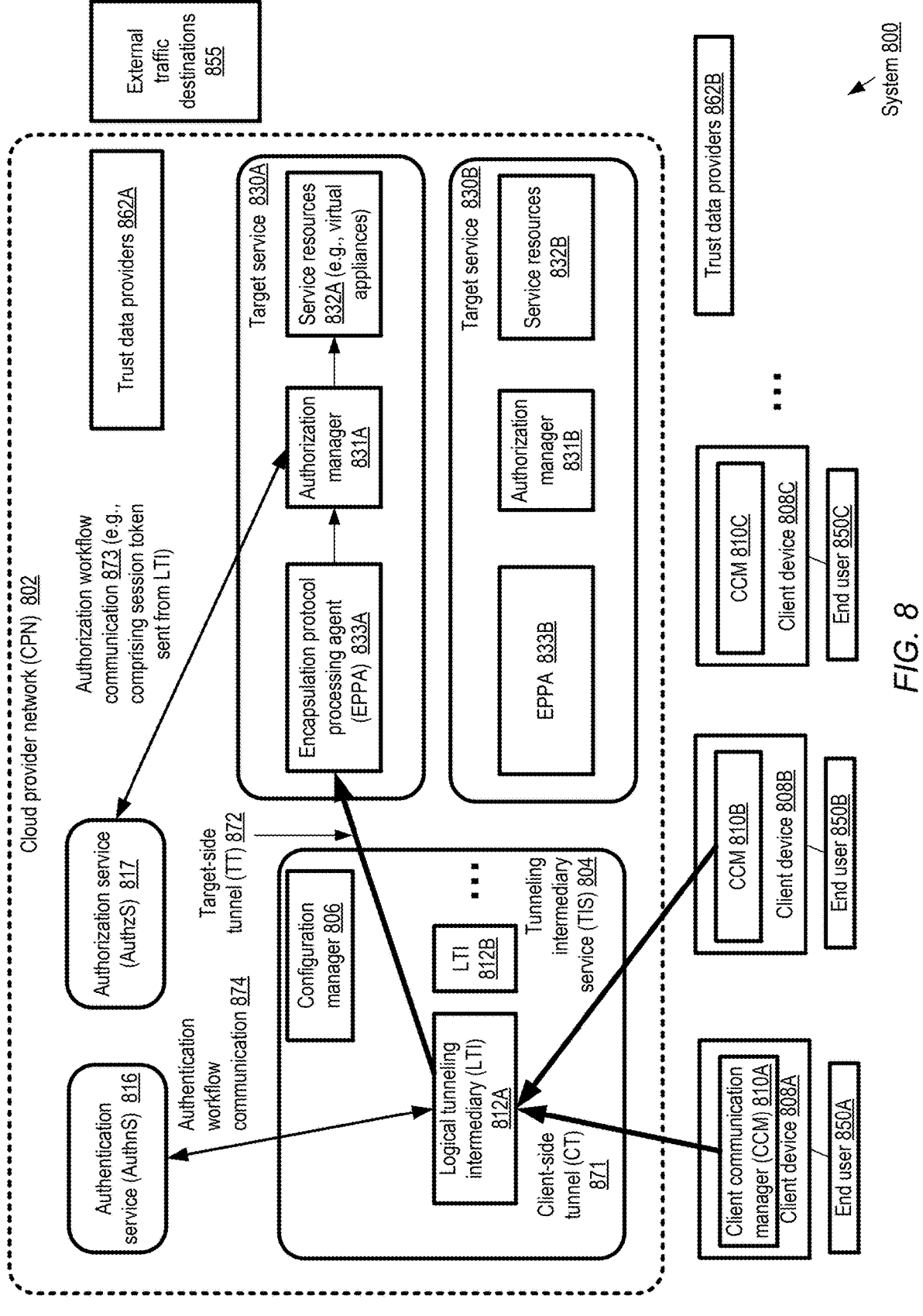
FIG. 8 illustrates an example system environment in which a tunneling intermediary service may be used to secure accesses directed to several target services implemented at a cloud computing environment, according to at least some embodiments.

In some embodiments, a cloud provider network may be used to implement various services that require domain-specific authorization workflows for certain types of network traffic. Such traffic may be transmitted to the service using a tunneling intermediary service in various embodiments. FIG. 8 illustrates an example system environment in which a tunneling intermediary service may be used to secure accesses directed to several target services implemented at a cloud computing environment, according to at least some embodiments. As shown, system 800 may include resources and artifacts of a cloud provider network (CPN) 802 at which a tunneling intermediary service (TIS) 804 is implemented to help support a zero-trust security model for traffic which originates at a set of client devices outside the CPN and is to be processed at target services of the CPN. In at least some embodiments, one or more of the services shown in FIG. 8, such as the TIS and the target services may be implemented as lower-level services or constituent services within a virtualized computing service (VCS) of the CPN 802, and/or may be built using compute instances or virtual machines of the VCS. The TIS may be used to perform authentication for packets of the traffic, while a respective authorization manager at each of the target services may be responsible for domain-specific or target service-specific authorization workflows for the packets in the depicted embodiment. In some cases, the traffic originating at the client devices, such as client devices 808A, 808B, or 808C, may be intended for delivery to external traffic destinations 855 (such as resources of the public Internet), and the target services such as target service 830A or target service 830B may comprise virtual appliances that perform auxiliary tasks such as implementation of firewalls, DNS request filtering and the like. In other cases, the ultimate destinations of the traffic may comprise resources within the target services themselves. In the depicted embodiment, target service 830A includes service resources 832A (such as virtual appliances), authorization manager 831A and an encapsulation protocol processing agent (EPPA) 833A, while target service 830B includes service resources 832B, authorization manager 831B and EPPA 833B.

In the depicted embodiment, a configuration manager 806 of the TIS 804 may establish one or more logical tunneling intermediaries (LTIs), such as LTI 812A or LTI 812B for transmitting traffic originating at the client devices to target services. A given LTI may itself comprise several nodes spread across one or more computing resources (such as compute instances of a VCS) in one or more availability zones or AZs of the CPN. Individual ones of the client devices 808 (such as laptops, desktops or mobile devices) may have respective sets of client communication manager (CCM) software installed, such as CCM 810A at client device 808A, CCM 810B at client device 808B, and CCM 810C at client device 808C. The CCM software may be provided by, or available as downloads from, the CPN 802 in various embodiments.

A given LTI may establish at least two networking tunnels for traffic originating at a particular client device in the depicted embodiment. One tunnel, over which encrypted traffic is sent, may be established between a CCM at the client device and the LTI, e.g., using a first networking protocol. Such a tunnel may be referred to as a client-side tunnel (CT), such as CT 871 for traffic originating at client device 808A and sent via LTI 812A. A second tunnel may be established, using a second protocol, with an EPPA of a target service. This second type of tunnel may be referred to as a target-side tunnel (TT), such as TT 872 established between LTI 812A and EPPA 833A. The TIS may operate in a multi-tenant manner in various embodiments—for example, traffic from multiple end users may be sent from respective client devices to their destinations via respective CTs to a given LTI, and that LTI may use one or more TTs to send the traffic to a given target service.

A baseline packet generated on behalf of an end user (such as end user 850A, 850B or 850C) at a client device, intended for delivery a particular destination resource via a target service or at a target service, may be sent by the CCM of the client device via a CT to an LTI 812. An authentication workflow may be performed by the LTI upon receiving such a baseline packet, in some embodiments, in which trust data associated with the packet, including user metadata of the end user as well as device metadata of the client device, is transmitted to an authentication service (AuthnS) 816 (as part of authentication workflow communication 874) and the session token is received in exchange for the trust data if the packet can be successfully authenticated. The trust data may be obtained from trust data providers 862A within the CPN, and/or trust data providers 862B outside the CPN in different embodiments. In at least one embodiment, the trust data may be obtained from the trust data providers by the CCM, and sent to the LTI by the CCM.

The session token may take up less memory or storage than the combination of the user metadata and device metadata in some implementations. In at least one embodiment, an initial version of the session token may be obtained when the client-side tunnel is set up, and the versions may be updated based on token refresh criteria (such as if and when the device state of the client device changes). Note that the session token may not indicate that the packet has satisfied an authorization requirement in at least some embodiments. Of course, if the baseline packet cannot be successfully authenticated, it may be dropped at the LTI in various embodiments. In some embodiments an error message may be logged indicating the reason why the packet was dropped.

The LTI may send an encapsulation packet comprising the session token (e.g., in a header) and the baseline packet (e.g., as part of the payload of the encapsulation packet) to the EPPA via target-side tunnel 872 in the depicted embodiment. The EPPA may send at least the session token to an authorization manager 831, which may initiate an authorization workflow in which the session token is used. In at least one embodiment, a given target service may comprise multiple EPPAs, and an LTI may choose one of the EPPAs for a given packet flow using techniques such as flow hashing. In some scenarios in which multiple EPPAs are available, the LTI may balance the overall workload of the target service among the EPPAs. In some embodiments, the authorization workflow may include transmission of one or more messages between the authorization manager and an authorization service (AuthzS) 817 of the CPN, as indicated by the arrow labeled authorization workflow communication 873. If the authorization workflow indicates that the delivery of the baseline packet to its intended destination resource is permitted, the baseline packet may be sent to the intended destination resource in various embodiments. Otherwise, one or more rejection actions may be taken—e.g., the baseline packet may be dropped, an error message may be sent to the end user on whose behalf the baseline packet was transmitted, a log record indicating the reason why the packet was rejected may be stored, and so on.

FIG. 9 illustrates a technique in which session tokens obtained at a tunneling intermediary may be used during authorization workflows coordinated at target services, according to at least some embodiments. In the depicted embodiment, a session token generator 920 may obtain end user identity metadata 912 and client device status metadata 914 with respect to a particular baseline packet that is to be processed at a target service. In at least some embodiments, the session token generator may be implemented at an authentication service, to which the end user identity metadata and the client device metadata are sent by an LTI. The user identity metadata and the client device metadata may be obtained from one or more trust data providers by a CCM of the client device, and sent by the CCM to the LTI.

Based at least in part on examination of the end user identity metadata and the client device status metadata, in various embodiments the session token generator may produce a session token 930, which is typically much smaller (e.g., taking only a few bytes of storage or memory) than the combination of end user identity metadata and client device statues metadata. The session token may in effect be obtained by the LTI in exchange for the end user identity metadata and the client device status metadata in some embodiments. The LTI may then send the session token to the authorization manager 935 of the target service, indicating that the baseline packet has been authenticated. The authorization manager may use the session token as part of an authorization workflow to determine whether the access requested in the baseline packet is permitted or not in some embodiments. In at least one embodiment, the authorization workflow may comprise one or more messages being sent from the authorization manager to an authorization service. In other embodiments, the authorization workflow may be performed entirely by the authorization manager within the target service. The authorization manager may be distributed across multiple nodes or computing devices in some embodiments.

Figure 10:
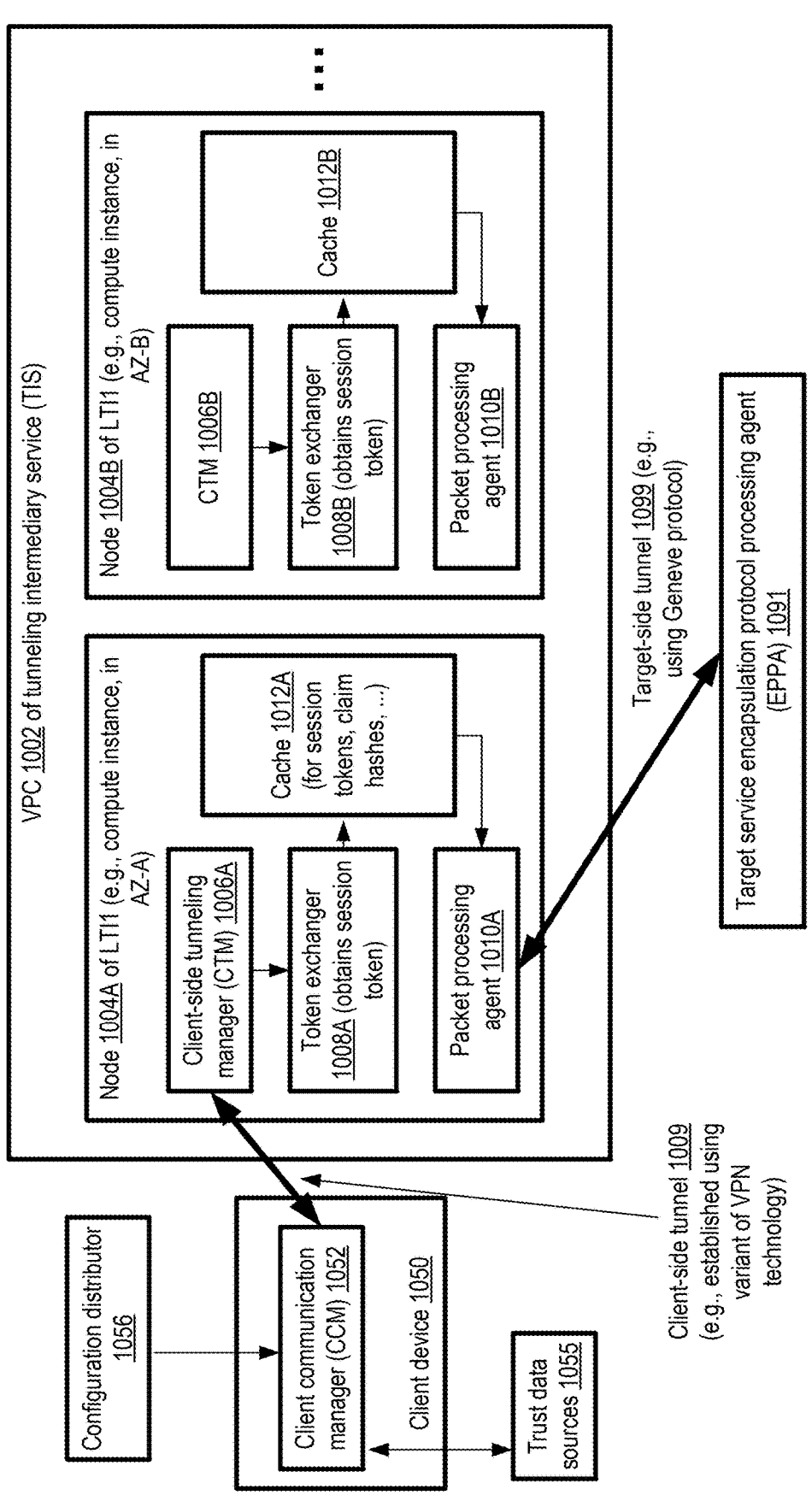
FIG. 10 illustrates example components of a node of a distributed logical tunneling intermediary, according to at least some embodiments.

In some embodiments, as indicated earlier, an LTI may comprise multiple nodes. FIG. 10 illustrates example components of a node of a distributed logical tunneling intermediary, according to at least some embodiments. In the example scenario shown in FIG. 10, an LTI LTI1 may comprise at least two nodes, node 1004A and node 1004B. Each of the nodes may, for example, be implemented at respective compute instances launched in a VPC 1002 created on behalf of the tunneling intermediary service. Such VPCs may be referred to as provider network service implementation VPCs. In at least some embodiments, the nodes of the LTI may be distributed across availability zones of the cloud provider network for high availability or fault tolerance—e.g., node 1004A may be set up in availability zone AZ-A, while node 1004B may be set up in availability zone AZ-B.

Each of the nodes may comprise a client-side tunneling manager (CTM), a token exchanger, a cache and a packet processing agent. For example, node 1004A may comprise CTM 1006A, token exchanger 1008A, cache 1012A and packet processing agent 1010A, while node 1004B may comprise CTM 1006B, token exchanger 1008B, cache 1012B and packet processing agent 1010B. Node 1004B may be configured to take over the responsibilities of node 1004A in the event of a failure at node 1004A or in the event that node 1004A becomes unreachable in the depicted embodiment. In one implementation, a CTM may comprise OpenVPN server software.

Client-side tunnel 1009 may be established between CTM 1006A of node 1004A and a CCM such as CCM 1052 of client device 1050, e.g., using LTI1 configuration metadata distributed to the CCM by a configuration distributor 1056 of the TIS in the depicted embodiment. In some embodiments, a version of a VPN protocol may be used to establish the client-side tunnel 1009; in other embodiments, other protocols may be employed. From one or more trust data sources 1055, CCM 1052 may obtain end user identity metadata (e.g., one or more authentication claims or tokens) of a particular end user on whose behalf a baseline packet is to be sent to one or more destinations using LTI1 in the depicted embodiment. CCM 1052 may also obtain client device status metadata (e.g., one or more client device status claims or tokens) from the set of trust data sources 1055 in the depicted embodiment.

The end user identity metadata and the device status metadata may be sent to CTM 1006A of node 1004A via the client-side tunnel. Token exchanger 1008A may then attempt to exchange the metadata for a session token prepared at an authentication service in at least some embodiments. If an authentication workflow for the baseline packet is successful, a session token may be obtained by token exchanger 1008A. The session token may be stored at cache 1012A. In some embodiments, hashes of the user identity claims/tokens and/or the client device state claims/tokens may be stored in cache 1012A as well. In one embodiment, the CCM may be assigned a public IP address (such as a public IP version 6 address) by a configuration manager of the cloud computing environment, and that IP address may be used as a key to access entries in cache 1012A.

Packet processing agent 1010A of node 1004A may establish a target-side tunnel 1099 (e.g., using the Geneve protocol) with a target service encapsulation protocol processing agent (EPPA) 1091 of a target service in the depicted embodiment. Corresponding to a given baseline packet sent from client device 1050 to a destination, the packet processing agent 1010A may construct an encapsulation packet whose payload comprises the baseline packet, with the session token included in a header of the encapsulation packet. The encapsulation packet may be sent to the EPPA via tunnel 1099. The EPPA may transmit at least the session token to an authorization agent of the target service in the depicted embodiment, where the session token may be used during an authorization workflow associated with the baseline packet.

In at least some embodiments, the session token may be refreshed or re-generated periodically during a given communication session or packet flow. For example, the cached version of the session token may have an expiration period (which may be referred to as a token refresh criterion), resulting in invalidation of the cached version after some time. When the cached version expires, a new version may be obtained using updated device status metadata and/or updated end user identity metadata in the depicted embodiment. In some embodiments, CCM 1052 may take actions based on one or more token refresh criteria. When such criteria are satisfied, the CCM 1052 may send current/updated user identity metadata and/or device status metadata to LTI1, resulting in generation of a new session token. In one embodiment, for example, the CCM 1052 may periodically communicate with one or more device trust data sources to determine whether the device status of the client device has changed, or the CCM may be automatically notified if/when the client device status changes. Such a change may occur, for example, if new software happens to be installed on the client device, or if the client device has not been updated with the latest hot fixes from the vendor of an operating system of the client device. If such a change occurs, an attempt to generate a new session token may be undertaken by an LTI based on the current device status metadata of the client device (provided by the CCM to the LTI) in at least some embodiments. In one embodiment, the LTI may obtain user identity metadata and/or device status metadata from one or more trust data sources, e.g., instead of obtaining such metadata from the CCM.

Figure 11:
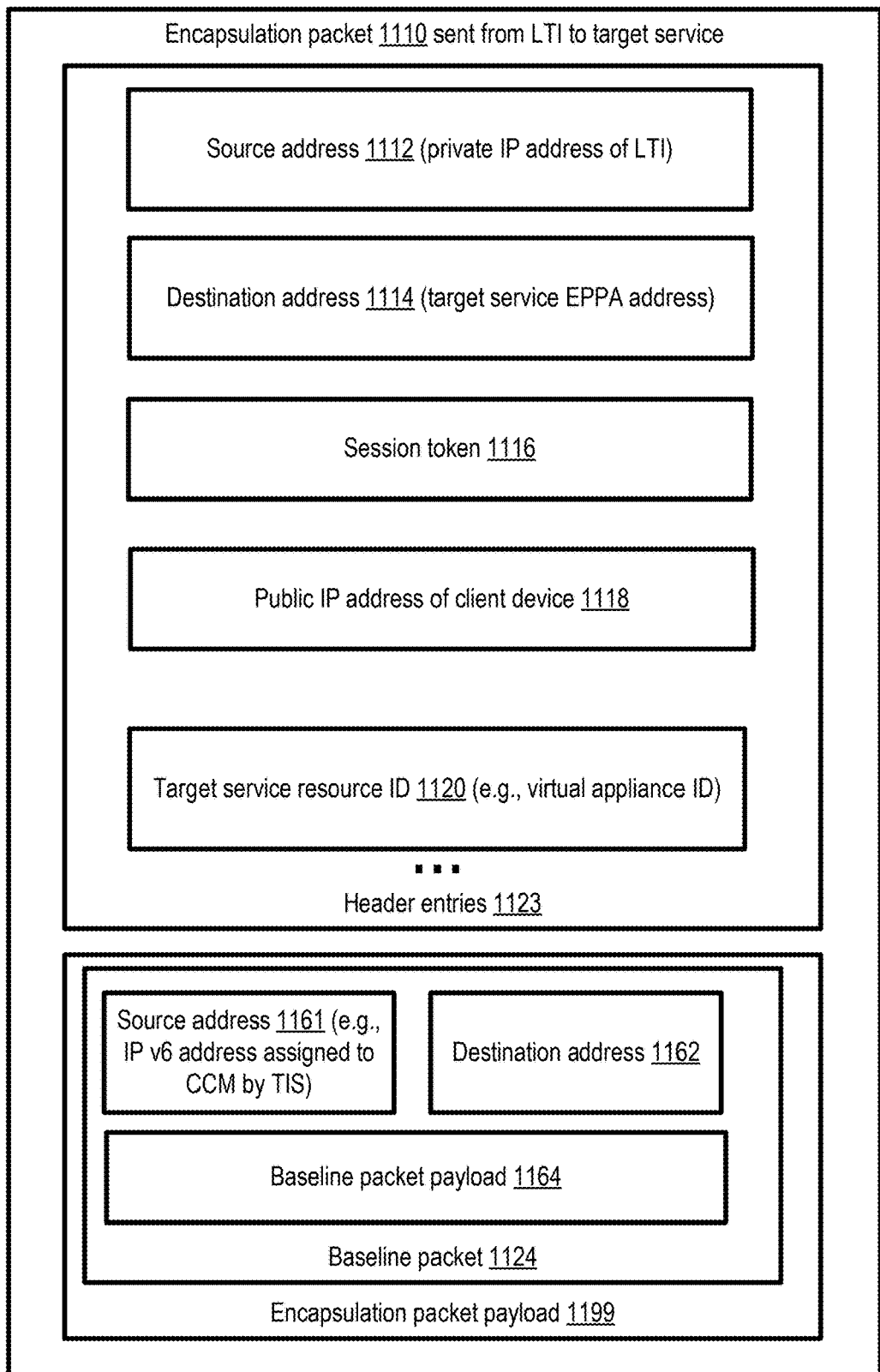
FIG. 11 illustrates example elements of an encapsulation packet which may be prepared at a logical tunneling intermediary for transmission to a target service, according to at least some embodiments.

FIG. 11 illustrates example elements of an encapsulation packet which may be prepared at a logical tunneling intermediary for transmission to a target service, according to at least some embodiments. Encapsulation packet 1110 sent from an LTI to an EPPA of a target service may comprise a set of header entries 1123 and an encapsulated baseline packet 1124. The baseline packet may be included in encapsulation packet payload 1199. The baseline packet may comprise a baseline packet payload 1164, and may indicate source address 1161 (such as an IP version 6 address which may be assigned to the CCM of the client device from which the baseline packet is being sent) and a destination address 1162 to which the baseline packet is being directed by the end user. In some embodiments in which, for example, the target service comprises virtual firewall appliances or virtual DNS servers, the destination address 1162 may be an address of a resource of the public Internet. In other embodiments, the destination address may be an address of a resource within the target service itself.

Header entries 1123 of encapsulation packet 1110 may include a source address 1112, such as a private IP address (an address within a private address range of a TIS VPC) of the LTI or a particular node of the LTI in some embodiments. Header entries 1123 may indicate a destination address 1114, such as a private IP address of a target service EPPA in the depicted embodiment. The session token 1116 may be sent as an encapsulation packet header entry in at least one embodiment. In some embodiments, a public IP address of the client device 1118 may be included as a header entry. In one embodiment, an identifier of a particular resource within the target service with which the LTI is programmatically associated may be included as a header entry. Such a target service resource ID 1120 may be specified in some embodiments as a parameter of a programmatic request submitted by a target service owner to create an LTI. For example, in a scenario in which the target service comprises virtual firewall appliances, a given LTI may be established for, and be associated with, a particular firewall appliance and the identifier of that firewall appliance may be included in the encapsulation packet. In one implementation in which the Geneve protocol is used for the target-side tunnel, one or more of the header entries 1123 may be represented as respective Geneve options. In some embodiments, the encapsulation packets sent from LTIs to target service EPPAs may have a structure which differs from the structure shown in FIG. 11.

Figure 12:
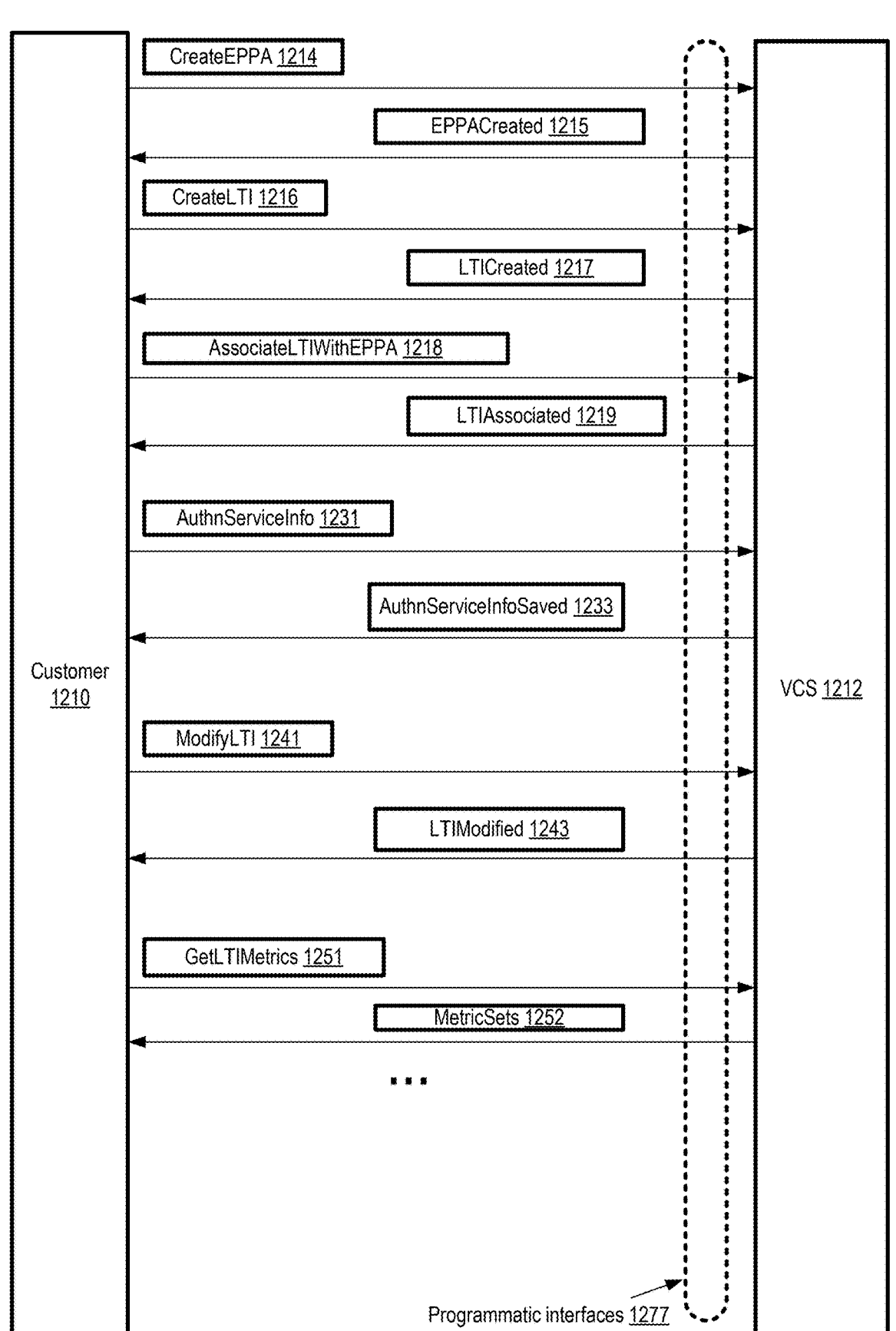
FIG. 12 illustrates example programmatic interactions pertaining to configuration and use of a tunneling intermediary service to secure accesses to resources of target services, according to at least some embodiments.

FIG. 12 illustrates example programmatic interactions pertaining to configuration and use of a tunneling intermediary service to secure accesses to resources of target services, according to at least some embodiments. A VCS 1212 within which a TIS similar in features and functionality to TIS 804 of FIG. 8 is implemented, and within which at least a portion of one or more target services is implemented, may provide a set of programmatic interfaces 1277 in the depicted embodiment. The programmatic interfaces may include one or more web-based consoles, command-line tools, graphical user interfaces and/or APIs. A VCS customer 1210 (e.g., an owner of a target service) may utilize the programmatic interfaces to submit requests and information pertaining to securing traffic directed to target services using a TIS, and receive corresponding responses.

In at least some embodiments, a customer 1210 may submit a CreateEPPA request 1214, requesting establishment of an encapsulation protocol processing agent (EPPA) which can be used as an entry point for packets sent from one or more LTIs to a target service specified in the request. The agent may be configured, and an EPPACreated response 1215 may be sent to the customer in the depicted embodiment. In one embodiment in which the target service comprises virtual appliances, the EPPA may comprise a load balancing gateway or gateway load balancer (GWLB) of the cloud computing environment, and a network endpoint which can be used to send the packets to the target service via the load balancing gateway may be configured within a VPC at which one or more of the LTIs are set up for the packets.

A CreateLTI request 1216 may be submitted by the customer to request configuration of a logical tunneling intermediary for transmitting traffic from a set of client devices to a set of destinations in the depicted embodiment. In some embodiments, the CreateLTI request may indicate performance and/or availability requirements for the LTI. Such requirements may be used by a configuration manager of the VCS to determine the number of nodes which should initially be included in the LTI (e.g., with individual ones of the nodes run at respective VCS compute instances selected from an instance family which offers compute instances of a particular computing performance capacity) in some embodiments. In various embodiments, the TIS may automatically scale an LTI as needed—e.g., additional nodes may be added as the workload of the LTI increases if the per-node utilization exceeds a threshold. In at least one embodiment, nodes of the LTI may be distributed across multiple availability zones, e.g., in response to availability requirements indicated in the CreateLTI request, or based on default LTI availability settings of the VCS or TIS. After the LTI nodes are set up, an LTICreated message 1217 may be sent to the customer. In one embodiment in which the target service comprises virtual appliances, identifiers of one or more of the virtual appliances to which traffic is to be directed via the LTI may be indicated in the CreateLTI request, and such identifiers may be stored in a metadata repository of the TIS or VCS.

In some embodiments, a customer 1210 may submit an AssociateLTIWithEPPA request 1218 to programmatically associate a specified EPPA with a specified LTI. The association may result in the establishment of a target-side tunnel between the LTI and the EPPA in some embodiments. An LTIAssociated message 1219 may be sent to the customer in the depicted embodiment.

An AuthnServiceInfo message 1231 may be sent by the customer in some embodiments to specify an authentication service which is to be utilized or invoked by an LTI to implement an authentication workflow for packets originating at a set of client devices. In some embodiments, such an authentication service may be implemented at the cloud provider network. An AuthnServiceInfoSaved message 1233 may be sent to the client after the information provided about the authentication service is saved in a metadata repository. In at least one embodiment, an authentication service may not be used; instead, the LTI may complete the authentication workflow itself.

In one embodiment, a ModifyLTI request 1241 may be sent by a customer to change one or more properties or attributes of a specified LTI. For example, the customer may indicate a change in required performance of the LTI (which may lead a configuration manager to change the number of nodes of the LTI and/or the type of compute instances used for the nodes), a change to an availability requirement of the LTI (which may lead to instantiation of LTI nodes in additional availability zones), an indication that the LTI is to be associated with a different EPPE than the EPPE with which the LTI is currently associated, etc. The requested property changes may be applied, and an LTIModified message 1243 may be sent to the customer in some embodiments.

The VCS or TIS may collect various metrics pertaining to LTIs and EPPAs in some embodiments, such as the rate at which traffic is transmitted via LTIs to individual EPPAs, changes (if any) over time in the number of resources whose traffic is transmitted via individual LTIs, the number of packets which were rejected at an LTI and the reasons for their rejection, and so on. A GetLTIMetrics request 1251 may be sent by a customer some embodiments to obtain such metrics. The requested metrics may be sent to the customer in one or more MetricSets messages 1252 in the depicted embodiment. In some embodiments, programmatic interactions other than those shown in FIG. 12 may be supported for configuring and using LTIs.

FIG. 13 is a flow diagram illustrating aspects of operations, pertaining to configuration and use of a tunneling intermediary service to secure accesses to resources of target services, according to at least some embodiments. As shown in element 1301, an LTI may be established for transmission of packets between a set of client devices and a target service implemented at least in part using cloud computing resources. The target service may have an associated authorization manager for authorizing access from the client devices to a set of destination resources using a target service-specific or domain-specific authorization workflow in various embodiments. In at least some embodiments, the LTI may comprise multiple nodes implemented at least in part at respective compute instances of a VCS of a cloud computing environment. In various embodiments the cloud computing environment or the VCS may include a tunneling intermediary service at which the LTI is created by a configuration manager. In the depicted embodiment, the target service may comprise an EPPA capable of processing messages formatted according to an encapsulation protocol used by the LTI. In some embodiments, any of several encapsulation protocols may be used by LTIs, and a customer on whose behalf the LTI is set up may specify the particular protocol that a given LTI is to use to communicate with an EPPA of a target service of that customer.

At least two networking tunnels may be established for traffic originating at a client device in the depicted embodiment. One tunnel, established using a first protocol may be established between a client communication manager (CCM) of the client device and the LTI (element 1304). Traffic sent over this tunnel may be encrypted in various embodiments. In at least one embodiment, a protocol similar to a VPN protocol may be used for the first tunnel, without requiring end users of the client device to request establishment of a VPN connection.

A second network tunnel may be established between the LTI and the EPPA (element 1307) in various embodiments. The second tunnel may be set up using a different protocol than the first tunnel. In one embodiment, a protocol similar to Geneve may be used for the second tunnel.

Via the first tunnel, a baseline packet requesting access to a particular destination resource from the client device may be received at the LTI (element 1310). The destination resource may be in the public Internet in some embodiments, with the target service being used to perform one or more types of packet processing such as firewall checks. In other embodiments, the destination resource may be part of the target service—for example, the target service may be a database service implemented by a third party (an entity other than the operator of the cloud provider network, and other than the end user that sends the baseline packet), and the destination resource may comprise a database instance within the target service.

At the LTI, an encapsulation packet comprising the baseline packet may be prepared in various embodiments (element 1313). The encapsulation packet may include a session token in the depicted embodiment, indicating that an authentication requirement has been satisfied by the baseline packet. (If the authentication requirement was not satisfied, the baseline packet may be rejected/dropped in various embodiments instead of being transmitted to the EPPA.) The session token may be obtained at the LTI using at least two types of information in some embodiments: (a) user identity information of an end user on whose behalf the baseline packet is transmitted and (b) device status metadata of the client device at which the baseline packet originated. In one embodiment, for example, the LTI may submit the user identity information and the device state information to an authentication service implemented at the cloud provider network, and receive the session token in exchange.

The encapsulation packet may be sent via the second tunnel from the LTI to the EPPA in various embodiments (element 1316). The session token (and/or other components of the encapsulation packet) may be extracted by the EPPA and/or other components of the target service. At least the session token may be provided to the authorization manager of the target service, which can use the session token if needed in a target service-specific authorization workflow to determine whether the access requested to the destination resource is to be permitted.

If a determination is made via the authorization workflow that access is permitted, the baseline packet may be delivered to the destination resource in the depicted embodiment (element 1319). If access is not permitted, rejection actions may be taken, such as dropping the packet, sending an error message to the end user, etc.

It is noted that in various embodiments, some of the operations shown in the flow diagrams of FIG. 7 and/or FIG. 13 may be implemented in a different order than that shown in the figure, or may be performed in parallel rather than sequentially. Additionally, some of the operations shown in these flow diagrams may not be required in one or more implementations.

Figure 14:
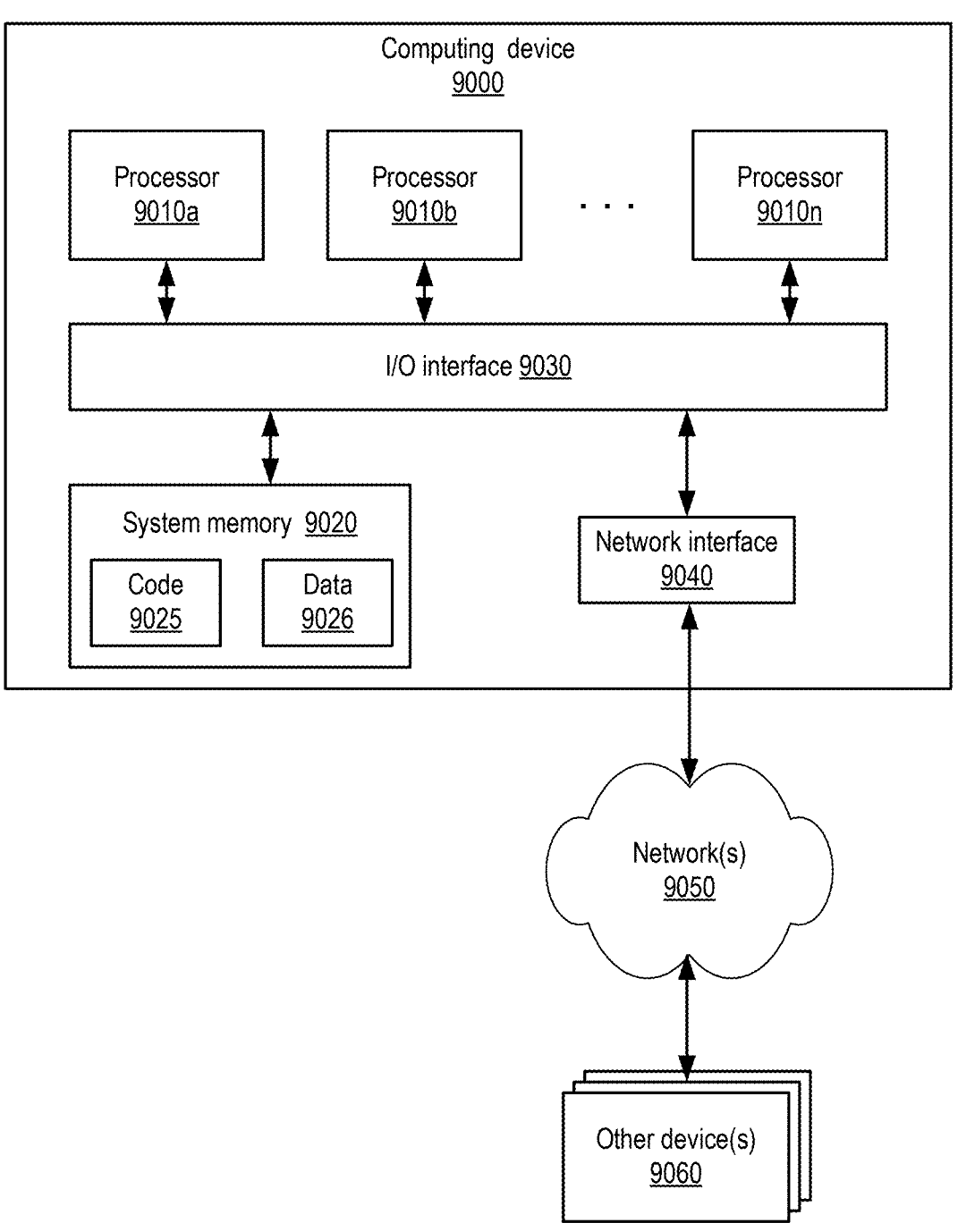
FIG. 14 is a block diagram illustrating an example computing device that may be used in at least some embodiments.

In at least some embodiments, a server that implements the types of techniques described herein (e.g., including the described functionality of various cloud provider network components including configuration managers, GAEs, AVs, LTIs, and the like), may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 13. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040.

Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a configuration manager of a cloud computing environment; and
   an access verifier of the cloud computing environment;
   wherein the configuration manager is configured to:
   establish a group access endpoint to enable access, in accordance with a security policy, from a set of client devices outside the cloud computing environment to individual ones of a group of resources which satisfy a group membership criterion, wherein network addresses assigned to resources of the group are selected from an address range of a virtual private cloud of the cloud computing environment;
   programmatically associate the access verifier with the group access endpoint;
   transmit, to a client communication manager, installed on a client device of the set of client devices, configuration metadata enabling connectivity to be established between the client communication manager and the group access endpoint; and
   in response to detecting that, as a result of a configuration change, a particular resource of the virtual private cloud satisfies the group membership criterion, generate a Domain Name Service (DNS) record for the particular resource, wherein the DNS record includes a DNS name generated by the configuration manager for the particular resource, wherein the DNS record includes a network address assigned to the particular resource by the configuration manager, and wherein prior to the configuration change, the group membership criterion was not satisfied by the particular resource; and wherein the access verifier is configured to:
obtain a packet transmitted by the client communication manager to the group access endpoint via a secure networking channel established using at least a portion of the configuration metadata, wherein a destination indicated by a user of the client device for the packet comprises a portion of the DNS record, wherein the secure networking channel is established without submission of a Virtual Private Network (VPN) connection establishment request by the user, and wherein the packet is directed by the user without utilizing a web browser; and
in response to determining, based at least in part on (a) the security policy, (b) identity metadata of the user, obtained at the access verifier from the client communication manager and (c) device status metadata pertaining to the client device, obtained at the access verifier from the client communication manager, that the packet satisfies authentication and authorization requirements for delivery to the particular resource, cause the packet to be delivered to the particular resource.

2. The system as recited in claim 1, wherein the configuration manager is further configured to:
receive, via a programmatic interface from a customer on whose behalf the group access endpoint is established, an indication of a DNS sub-domain to be used for DNS names assigned to resources of the group, wherein the DNS record is based at least in part on the DNS sub-domain.

3. The system as recited in claim 1, wherein the configuration manager is further configured to:
establish the group access endpoint in response to a programmatic request.

4. The system as recited in claim 1, wherein the configuration manager is further configured to:
receive, via a programmatic interface, an indication of a device trust data source, wherein the device status metadata is obtained from the device trust data source.

5. The system as recited in claim 1, wherein the configuration manager is further configured to:
indicate, in response to a programmatic request specifying the group access endpoint, one or more resources which can be accessed via the group access endpoint.

6. A computer-implemented method, comprising:
establishing an access endpoint to enable access, in accordance with a security policy, from a set of client devices outside a cloud computing environment to individual ones of a group of resources of the cloud computing environment which satisfy a group membership criterion;
in response to detecting that, as a result of a configuration change, a particular resource of the cloud computing environment satisfies the group membership criterion, generating a Domain Name Service (DNS) record for the particular resource; and
receiving, at an access verifier associated with the access endpoint, from a client communication manager running at a client device of the set of client devices, a packet directed by a user of the client device to the particular resource, wherein the particular resource is indicated as a destination of the packet using content of the DNS record; and

in response to determining, by the access verifier, based at least in part on (a) the security policy, (b) user identity metadata of the user and (c) device status metadata pertaining to the client device, that the packet satisfies authentication and authorization requirements for delivery to the particular resource, causing the packet to be delivered to the particular resource.

7. The computer-implemented method as recited in claim 6, wherein the group membership criterion indicates a Classless Inter-Domain Routing (CIDR) block of private addresses of a virtual private cloud (VPC), wherein respective private addresses of the CIDR block are assigned to members of the set of resources.

8. The computer-implemented method as recited in claim 6, wherein the group membership criterion indicates a string assigned as a tag to members of the set of resources.

9. The computer-implemented method as recited in claim 6, wherein the group membership criterion indicates one or more of: (a) a performance property of individual members of the set of resources or (b) a functional capability of individual members of the set of resources.

10. The computer-implemented method as recited in claim 6, wherein the packet is sent by the user using one of: (a) an ssh (secure shell) command, (b) a remote desktop protocol command or (c) a remote database access command.

11. The computer-implemented method as recited in claim 6, further comprising:
receiving, at a network-accessible access management service via a programmatic interface from a customer on whose behalf the access endpoint is established, an indication of a DNS sub-domain to be used for DNS names assigned to resources of the group, wherein a DNS name included in the DNS record is based at least in part on the DNS sub-domain.

12. The computer-implemented method as recited in claim 6, further comprising:
subscribing to a configuration event notifier of a virtualized computing service, wherein the particular resource comprises a virtual machine of the virtualized computing service; and
detecting the configuration change based at least in part on a notification from the configuration event notifier.

13. The computer-implemented method as recited in claim 6, wherein the configuration change comprises one or more of: (a) launching of a compute instance, (b) assignment of an Internet Protocol address, or (c) a change to a tag associated with a compute instance.

14. The computer-implemented method as recited in claim 6, further comprising:
assigning an IP version 6 address to the particular resource in response to detecting that the particular resource satisfies the group membership criterion, wherein the packet received at the access verifier has the IP version 6 address as a destination address.

15. The computer-implemented method as recited in claim 6, further comprising:
receiving, at the access verifier, from the client communication manager, another packet directed by the user of the client device to the particular resource; and
in response to determining, by the access verifier, based at least in part on updated device status metadata pertaining to the client device, that the packet does not satisfy a requirement for delivery to the particular resource, causing the other packet not to be delivered to the particular resource.

16. A non-transitory computer-accessible storage medium storing program instructions that when executed on a processor:

establish an access endpoint to enable access from a set of client devices outside a cloud computing environment to a group of resources of the cloud computing environment which satisfy a group membership criterion;

in response to detecting that, as a result of a configuration change, a particular resource of the cloud computing environment satisfies the group membership criterion, generating addressing information for the particular resource; and receiving, at an access verifier associated with the access endpoint, from a client communication manager running at a client device of the set of client devices, a packet directed by a user of the client device to the particular resource using the addressing information; and in response to determining, by the access verifier, based at least in part on (a) user identity metadata of the user and (b) device status metadata pertaining to the client device, that the packet satisfies security requirements for delivery to the particular resource, causing the packet to be delivered to the particular resource.

17. The non-transitory computer-accessible storage medium as recited in claim 16, wherein the group member-ship criterion indicates a Classless Inter-Domain Routing (CIDR) block of private addresses of a virtual private cloud (VPC), wherein respective private addresses of the CIDR block are assigned to members of the set of resources.

18. The non-transitory computer-accessible storage medium as recited in claim 16, wherein the packet is directed by the user to the particular resource using a protocol other than a web service protocol.

19. The non-transitory computer-accessible storage medium as recited in claim 16, storing further program instructions that when executed on the processor:

receive, at a network-accessible access management service via a programmatic interface from a customer on whose behalf the access endpoint is established, an indication of a DNS sub-domain to be used for DNS names assigned to resources of the group, wherein a DNS name included in the addressing information is based at least in part on the DNS sub-domain.

20. The non-transitory computer-accessible storage medium as recited in claim 16, storing further program instructions that when executed on the processor:

indicate, in response to a programmatic request specifying the access endpoint, one or more resources which can be accessed via the access endpoint.

* * * * *